United States Patent
Li et al.

(10) Patent No.: US 11,321,593 B2
(45) Date of Patent: May 3, 2022

(54) METHOD AND APPARATUS FOR DETECTING OBJECT, METHOD AND APPARATUS FOR TRAINING NEURAL NETWORK, AND ELECTRONIC DEVICE

(71) Applicant: BEIJING SENSETIME TECHNOLOGY DEVELOPMENT CO., LTD, Beijing (CN)

(72) Inventors: Hongyang Li, Beijing (CN); Yu Liu, Beijing (CN); Wanli Ouyang, Beijing (CN); Xiaogang Wang, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 328 days.

(21) Appl. No.: 16/314,406

(22) PCT Filed: Feb. 13, 2018

(86) PCT No.: PCT/CN2018/076653
§ 371 (c)(1),
(2) Date: Dec. 29, 2018

(87) PCT Pub. No.: WO2018/153319
PCT Pub. Date: Aug. 30, 2018

(65) Prior Publication Data
US 2019/0156144 A1    May 23, 2019

(30) Foreign Application Priority Data
Feb. 23, 2017    (CN) .......................... 201710100676.1

(51) Int. Cl.
*G06K 9/62*    (2022.01)
*G06N 3/08*    (2006.01)
(Continued)

(52) U.S. Cl.
CPC ........... *G06K 9/629* (2013.01); *G06K 9/6257* (2013.01); *G06N 3/08* (2013.01); *G06V 10/22* (2022.01); *G06V 10/25* (2022.01); *G06V 10/462* (2022.01)

(58) Field of Classification Search
CPC combination set(s) only.
See application file for complete search history.

(56) References Cited

U.S. PATENT DOCUMENTS 9,177,225 B1 * 11/2015 Cordova-Diba .......... G06T 7/11
9,424,494 B1    8/2016 Lineback et al.
(Continued)

FOREIGN PATENT DOCUMENTS

| CN | 103413120 A | 11/2013 |
| CN | 105120130 A | 12/2015 |

(Continued)

OTHER PUBLICATIONS

Hazirbas et al., "FuseNet: Incorporating Depth into Semantic Segmentation via Fusion-Based CNN Architecture", 2016, ACCV (Year: 2016).*

(Continued)

*Primary Examiner* — Zhiyu Lu
(74) *Attorney, Agent, or Firm* — Syncoda LLC; Feng Ma

(57) ABSTRACT

An object detection method, a neural network training method, an apparatus, and an electronic device include: obtaining, through prediction, multiple fused feature graphs from images to be processed, through a deep convolution neural network for target region frame detection, obtaining multiple first feature graphs from a first subnet having at least one lower sampling layer, obtaining multiple second feature graphs from a second subnet having at least one upper sampling layer, and obtaining fused graph by fusing multiple first feature graphs and multiple second feature (Continued)

graphs respectively; and obtaining target region frame data according to the multiple fused feature graphs. Because the fused feature graphs better represent semantic features on high levels and detail features on low levels in images, target region frame data of big and small objects in images can be effectively extracted according to the fused feature graphs, thereby improving accuracy and robustness of object detection.

19 Claims, 13 Drawing Sheets

(51) Int. Cl.
*G06V 10/22* (2022.01)
*G06V 10/25* (2022.01)
*G06V 10/46* (2022.01)

(56) References Cited

U.S. PATENT DOCUMENTS

| | | | |
|---|---|---|---|
| 2018/0197037 A1 | 7/2018 | Navarrete et al. | |
| 2018/0211157 A1 | 7/2018 | Liu et al. | |
| 2021/0326587 A1* | 10/2021 | Yang | G06T 5/50 |
| 2021/0397876 A1* | 12/2021 | Hemani | G06K 9/629 |

FOREIGN PATENT DOCUMENTS

| | | |
|---|---|---|
| CN | 106126579 A | 11/2016 |
| CN | 106295678 A | 1/2017 |
| CN | 106296728 A | 1/2017 |
| CN | 106355573 A | 1/2017 |
| CN | 106447658 A | 2/2017 |
| CN | 106709532 A | 5/2017 |
| CN | 106709532 B | 3/2020 |

OTHER PUBLICATIONS

Yang et al., "Object Contour Detection with a Fully Convolutional Encoder-Decoder Network", Mar. 2016, arXiv (Year: 2016).*
Liu et al., "Multispectral Deep Neural Networks for Pedestrian Detection", Nov. 2016, DOI.org (Year: 2016).*
Hongyang Li etc., "Zoom Out-and-In Network with Recursive Training for Object Proposal", arXiv: 1702.05711v1 [cs.CV] Feb. 19, 2017.
Liang X., Deep Structural Models for Fine-grained Visual Parsing Doctoral Dissertation, Sun Yat-Sen University Guangzhou China, May 27, 2016, pp. 1-91, Figs. 2-3, 3-3, 3-5,4-1, Sections 1.2.1, 2-4. hli2020. Initial commit, hli2020/zoom_network [online], Feb. 14, 2017, the [date of search Oct. 27, 2020].
Written Opinion of the Singaporean application No. 11201907355X, dated Oct. 14, 2020.
First Office Action of the Japanese application No. 2019-545345, dated Nov. 4, 2020.
English translation of the Written Opinion of the International Search Authority in the international application No. PCT/CN2018/076653, dated May 9, 2018.
Cheng-Yang Fu et al. DSSD : Deconvolutional Single Shot Detector, <arXiv>, issued on Jan. 23, 2017, abstract, section 3, Fig. 1, FIG. 3.
Tsung-Yi Lin et al. Feature Pyramid Networks for Object Detection, <arXiv>, issued on Dec. 9, 2016, section 3, FIG. 2.
Abhinav Shrivastava et al. Beyond Skip Connections: Top-Down Modulation for Object Detection, <arXiv>, issued on Dec. 20, 2016, pp. 1-10.
Wei Liu et al. SSD: Single Shot MultiBox Detector, <arXiv>, issued on Dec. 29, 2016, pp. 1-17.
Alejandro Newell et al. Stacked Hourglass Networks for Human Pose Estimation, <arXiv>, issued on Jul. 26, 2016, pp. 1-17.
First Office Action of the Chinese application No. 201710100676.1, dated Jan. 19, 2020.
Jiang, Yingfeng et al. "A New Multi-scale Image Semantic Understanding Method Based on Deep Learning", Journal of Optoelectronics Laser 27(2), Feb. 29, 2016 (Feb. 29, 2016), pp. 224-230.
Zhang, Wenda et al., "Image Target Recognition Method Based on Multi-scale Block Convolutional Neural Network", Journal of Computer Applications 36(4), Apr. 10, 2016 (Apr. 10, 2016), pp. 1033-1038.
Gao, Kai et al., "Depth Map Filtering and Upsampling Method for Virtual View Rendering", Journal of Image and Graphics 18(9), Sep. 30, 2013 (Sep. 30, 2013), pp. 1085-1092.
International Search Report in the international application No. PCT/CN2018/076653, dated May 9, 2018.
Xie, J., et al., Deep3d: Fully automatic 2d-to-3d video conversion with deep convolutional neural networks., In European Conference on Computer Vision, Oct. 2016.
Mao, X. J., et al., Image restoration using very deep convolutional encoder-decoder networks with symmetric skip connections., In Proceedings of the 30th International Conference on Neural Information Processing Systems, Dec. 2016.
Second Office Action of the Japanese application No. 2019-545345, dated Feb. 24, 2021.

* cited by examiner

METHOD AND APPARATUS FOR DETECTING OBJECT, METHOD AND APPARATUS FOR TRAINING NEURAL NETWORK, AND ELECTRONIC DEVICE

CROSS-REFERENCE TO RELATED APPLICATION

The present application claims priority to Chinese Patent Application No. CN201710100676.1, filed to the Chinese Patent Office on Feb. 23, 2017, and entitled "METHOD AND APPARATUS FOR DETECTING OBJECT, METHOD AND APPARATUS FOR TRAINING NEURAL NETWORK, AND ELECTRONIC DEVICE," the disclosure which is incorporated herein by reference in its entirety.

TECHNICAL FIELD

The present disclosure relates to the image processing technologies, and in particular, to a method and an apparatus for detecting an object, a method and an apparatus for training a neural network, and an electronic device.

BACKGROUND

The objective of target area frame detection is to detect a plurality of rectangular frames where objects may exist from an image. In the current conventional technique of performing detection using a convolutional neural network, the size of the feature map is gradually reduced through the pooling layers in the convolutional neural network, thereby finally determining a rectangular frame where an object may exist. This network structure is called a "zoom-out structure".

SUMMARY

The present disclosure provides an image-based target area frame detection technique.

A method for detecting an object provided according to an aspect of embodiments of the present disclosure includes: predicting, by a deep convolutional neural network for target area frame detection, to obtain a plurality of fusion feature maps from a to-be-processed image, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; and obtaining target area frame data according to the plurality of fusion feature maps.

In an implementation of the present disclosure, the second sub-network is provided at the tail end of the first sub-network; the first sub-network has a plurality of first convolution layers and the at least one down-sampling layer; the down-sampling layer is provided between the plurality of first convolution layers; the second sub-network has a plurality of second convolution layers and the at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

In an implementation of the present disclosure, the at least one first convolution layer is provided with a first output branch for outputting the first feature map, and the second convolution layer is provided with a second output branch for outputting the second feature map.

In an implementation of the present disclosure, the second sub-network further has a plurality of third convolution layers, and an input of the third convolution layer includes the first output branch and the second output branch; the predicting to obtain the plurality of fusion feature maps includes: separately obtaining the fusion feature maps from output ends of the plurality of third convolution layers.

In an implementation of the present disclosure, at least one point in the fusion feature map has frame fusion detection data and prediction accuracy information corresponding to a plurality of object detection frames; the obtaining the target area frame data according to the plurality of fusion feature maps includes: separately obtaining target area frame data corresponding to the fusion feature maps according to the frame fusion detection data and prediction accuracy information in the at least one fusion feature map.

In an implementation of the present disclosure, the obtaining the target area frame data according to the plurality of fusion feature maps includes: separately obtaining primary target area frame data corresponding to the fusion feature maps; iteratively executing the following object area frame regression operation until the iteration meets an iteration termination condition: adjusting the fusion feature maps; and obtaining new primary target area frame data from the adjusted fusion feature maps; and using the primary target area frame data obtained through the iteration as target area frame data in the to-be-processed image.

In an implementation of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In an implementation of the present disclosure, the object area frame regression operation includes: separately convoluting the current fusion feature maps through the fourth convolutional layers to obtain the adjusted fusion feature maps; performing area pooling on the adjusted fusion feature maps through the pooling layers according to the current primary target area frame data to obtain a new fusion feature map; and obtaining the new primary target area frame data from the new fusion feature map.

In an implementation of the present disclosure, the third sub-network further has a fifth convolution layer provided at an output end of the pooling layer; the obtaining the new primary target area frame data from the new fusion feature map includes: performing normalized convolution on the new fusion feature map through the fifth convolution layer; and obtaining the new primary target area frame data from the fusion feature map subjected to normalized convolution.

In an implementation of the present disclosure, both the first sub-network and the second sub-network are Inception-Batch Normalization (Inception-BN) network structures, and the third sub-network is a Residual Network (ResNet) structure.

A method for training a neural network provided according to a second aspect of the present disclosure includes: inputting a sample image containing target area frame labeling information in a deep convolutional neural network for target area frame detection to detect to obtain a plurality of fusion feature maps, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; obtaining target area frame data of the sample image according to the plurality of fusion feature maps; determining first differential data for object frame detection according to the obtained target area frame data of the sample image and the target area frame labeling information; and adjusting a network parameter of the deep convolutional neural network according to the first differential data.

In an implementation of the present disclosure, the second sub-network is provided at the tail end of the first sub-network; the first sub-network has a plurality of first convolution layers and the at least one down-sampling layer; the down-sampling layer is provided between the plurality of first convolution layers; the second sub-network has a plurality of second convolution layers and the at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

In an implementation of the present disclosure, the at least one first convolution layer is provided with a first output branch for outputting the first feature map, and the second convolution layer is provided with a second output branch for outputting the second feature map.

In an implementation of the present disclosure, the second sub-network further has a plurality of third convolution layers, and an input of the third convolution layer includes the first output branch and the second output branch; the detecting to obtain the plurality of fusion feature maps includes: separately obtaining the fusion feature maps from output ends of the plurality of third convolution layers.

In an implementation of the present disclosure, at least one point in the fusion feature map has frame fusion detection data and prediction accuracy information corresponding to a plurality of object detection frames.

In an implementation of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In an implementation of the present disclosure, the method further includes: iteratively executing the following target area frame regression training operation until the iteration meets an iteration termination condition: separately convoluting the current fusion feature maps through the fourth convolutional layers to obtain the adjusted fusion feature maps; performing area pooling on the adjusted fusion feature maps through the pooling layers according to the current primary target area frame data to obtain a new fusion feature map; obtaining the new primary target area frame data from the new fusion feature map; determining second differential data for object frame detection according to frame regression data between the unadjusted primary target area frame data and the new primary target area frame data, the new primary target area frame data, and corresponding target area frame labeling information; and adjusting a network parameter of the third sub-network according to the second differential data.

In an implementation of the present disclosure, the third sub-network further has a fifth convolution layer provided at an output end of the pooling layer; the obtaining the new primary target area frame data from the new fusion feature map includes: performing normalized convolution on the new fusion feature map through the fifth convolution layer; and obtaining the new primary target area frame data from the fusion feature map subjected to normalized convolution.

In an implementation of the present disclosure, prior to inputting a sample image containing target area frame labeling information in a deep convolutional neural network for target area frame detection to detect to obtain a plurality of fusion feature maps, the method further includes: zooming the sample image so that a ground truth of at least one object area frame is covered by the object detection frame.

In an implementation of the present disclosure, the target area frame labeling information of the sample image includes labeling information of a positive sample area frame and labeling information of a negative sample area frame; the overlapping ratio of the positive sample area frame to the ground truth of the object area frame is not less than a first overlapping ratio value; the overlapping ratio of the negative sample area frame to the ground truth of the object area frame is not greater than a second overlapping ratio value; and the first overlapping ratio value is greater than the second overlapping ratio value.

In an implementation of the present disclosure, the target area frame labeling information of the sample image further includes labeling information of a neutral sample area frame; and the overlapping ratio of the neutral sample area frame to the ground truth of the object area frame is between the first overlapping ratio value and the second overlapping ratio value.

In an implementation of the present disclosure, in all the sample images, the proportion of a sum of the labeled positive sample area frames in the total number of frames of the positive sample area frames, the negative same area frames and the neutral sample area frames is not less than a predetermined first ratio, the first ratio is greater than 50%; the proportion of a sum of the labeled negative sample area frames in the total number of frames is not greater than a predetermined second ratio; and the proportion of a sum of the labeled neutral sample area frames in the total number of frames is not greater than a predetermined third ratio, the third ratio is not greater than half of the sum of the first ratio and the second ratio.

In an implementation of the present disclosure, both the first sub-network and the second sub-network are Inception-BN network structures, and the third sub-network is a ResNet structure.

An apparatus for detecting an object provided according to a third aspect of the present disclosure includes: a fusion feature map prediction module, configured to predict to obtain a plurality of fusion feature maps from a to-be-processed image through a deep convolutional neural network for target area frame detection, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; and a target area frame prediction module, configured to obtain target area frame data according to the plurality of fusion feature maps obtained by the fusion feature map prediction module.

In an implementation of the present disclosure, the second sub-network is provided at the tail end of the first sub-network; the first sub-network has a plurality of first convolution layers and the at least one down-sampling layer; the down-sampling layer is provided between the plurality of first convolution layers; the second sub-network has a plurality of second convolution layers and the at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

In an implementation of the present disclosure, the at least one first convolution layer is provided with a first output branch for outputting the first feature map, and the second convolution layer is provided with a second output branch for outputting the second feature map.

In an implementation of the present disclosure, the second sub-network further has a plurality of third convolution layers, and an input of the third convolution layer includes the first output branch and the second output branch; the fusion feature map prediction module is configured to separately obtain the fusion feature maps from output ends of the plurality of third convolution layers.

In an implementation of the present disclosure, at least one point in the fusion feature map has frame fusion detection data and prediction accuracy information corresponding to a plurality of object detection frames; the target area frame prediction module is configured to separately obtain target area frame data corresponding to the fusion feature maps according to the frame fusion detection data and prediction accuracy information in the at least one fusion feature map.

In an implementation of the present disclosure, the target area frame prediction module is configured to: separately obtain primary target area frame data corresponding to the fusion feature maps; iteratively execute the following object area frame regression operation until the iteration meets an iteration termination condition: adjusting the fusion feature maps; and obtaining new primary target area frame data from the adjusted fusion feature maps; and use the primary target area frame data obtained through the iteration as target area frame data in the to-be-processed image.

In an implementation of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In an implementation of the present disclosure, the target area frame prediction module includes: a frame adjusting unit, configured to separately convolute the current fusion feature maps through the fourth convolutional layers to obtain the adjusted fusion feature maps; an area pooling unit, configured to perform area pooling on the adjusted fusion feature maps through the pooling layers according to the current primary target area frame data to obtain a new fusion feature map; and a primary frame obtaining unit, configured to obtain the new primary target area frame data from the new fusion feature map.

In an implementation of the present disclosure, the third sub-network further has a fifth convolution layer provided at an output end of the pooling layer; the primary frame obtaining unit is configured to perform normalized convolution on the new fusion feature map through the fifth convolution layer; and obtain the new primary target area frame data from the fusion feature map subjected to normalized convolution.

In an implementation of the present disclosure, both the first sub-network and the second sub-network are Inception-BN network structures, and the third sub-network is a ResNet structure.

An apparatus for training a neural network provided according to a fourth aspect of the present disclosure includes: a fusion feature map detection module, configured to input a sample image containing target area frame labeling information in a deep convolutional neural network for target area frame detection to detect to obtain a plurality of fusion feature maps, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; a target area frame detection module, configured to obtain target area frame data of the sample image according to the plurality of fusion feature maps; a first difference obtaining module, configured to determine first differential data for object frame detection according to the obtained target area frame data of the sample image and the target area frame labeling information; and a first network training module, configured to adjust a network parameter of the deep convolutional neural network according to the first differential data.

In an implementation of the present disclosure, the second sub-network is provided at the tail end of the first sub-network; the first sub-network has a plurality of first convolution layers and the at least one down-sampling layer; the down-sampling layer is provided between the plurality of first convolution layers; the second sub-network has a plurality of second convolution layers and the at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

In an implementation of the present disclosure, the at least one first convolution layer is provided with a first output branch for outputting the first feature map, and the second convolution layer is provided with a second output branch for outputting the second feature map.

In an implementation of the present disclosure, the second sub-network further has a plurality of third convolution layers, and an input of the third convolution layer includes the first output branch and the second output branch; the fusion feature map detection module is configured to separately obtain the fusion feature maps from output ends of the plurality of third convolution layers.

In an implementation of the present disclosure, at least one point in the fusion feature map has frame fusion detection data and prediction accuracy information corresponding to a plurality of object detection frames.

In an implementation of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In an implementation of the present disclosure, the apparatus further includes: a frame regression iterative training module, configured to iteratively execute the following target area frame regression training operation until the iteration meets an iteration termination condition: separately convoluting the current fusion feature maps through the fourth convolutional layers to obtain the adjusted fusion feature maps; performing area pooling on the adjusted fusion feature maps through the pooling layers according to the current primary target area frame data to obtain a new fusion feature map; obtaining the new primary target area frame data from the new fusion feature map; determining second differential data for object frame detection according to frame regression data between the unadjusted primary target area frame data and the new primary target area frame data, the new primary target area frame data, and corresponding target area frame labeling information; and adjusting a network parameter of the third sub-network according to the second differential data.

In an implementation of the present disclosure, the third sub-network further has a fifth convolution layer provided at an output end of the pooling layer; the frame regression iterative training module is configured to perform normalized convolution on the new fusion feature map through the fifth convolution layer; and obtain the new primary target area frame data from the fusion feature map subjected to normalized convolution.

In an implementation of the present disclosure, the apparatus further includes: a preprocessing module, configured to zoom, prior to inputting a sample image containing target area frame labeling information in a deep convolutional neural network for target area frame detection to detect to obtain a plurality of fusion feature maps, the sample image so that a ground truth of at least one object area frame is covered by the object detection frame.

In an implementation of the present disclosure, the target area frame labeling information of the sample image includes labeling information of a positive sample area frame and labeling information of a negative sample area frame; the overlapping ratio of the positive sample area frame to the ground truth of the object area frame is not less than a first overlapping ratio value; the overlapping ratio of the negative sample area frame to the ground truth of the object area frame is not greater than a second overlapping ratio value; and the first overlapping ratio value is greater than the second overlapping ratio value.

In an implementation of the present disclosure, the target area frame labeling information of the sample image further includes labeling information of a neutral sample area frame; and the overlapping ratio of the neutral sample area frame to the ground truth of the object area frame is between the first overlapping ratio value and the second overlapping ratio value.

In an implementation of the present disclosure, in all the sample images, the proportion of a sum of the labeled positive sample area frames in the total number of frames of the positive sample area frames, the negative same area frames and the neutral sample area frames is not less than a predetermined first ratio, the first ratio is greater than 50%; the proportion of a sum of the labeled negative sample area frames in the total number of frames is not greater than a predetermined second ratio; and the proportion of a sum of the labeled neutral sample area frames in the total number of frames is not greater than a predetermined third ratio, the third ratio is not greater than half of the sum of the first ratio and the second ratio.

In an implementation of the present disclosure, both the first sub-network and the second sub-network are Inception-BN network structures, and the third sub-network is a ResNet structure.

An electronic device provided according to a fifth aspect of the present disclosure includes:

a processor and a memory;

the memory is configured to store at least one executable instruction, which enables the processor to execute the operation corresponding to the method for detecting an object according to any one of the embodiments of the present disclosure; or the memory is configured to store at least one executable instruction, which enables the processor to execute the operation corresponding to the method for training a neural network according to any one of the embodiments of the present disclosure.

Another electronic device provided according to a sixth aspect of the present disclosure includes:

a processor and the apparatus for detecting an object according to any one of the embodiments of the present disclosure, where when the processor runs the apparatus for detecting an object, units in the apparatus for detecting an object according to any one of the embodiments of the present disclosure are run; or a processor and the apparatus for training a neural network according to any one of the embodiments of the present disclosure, where when the processor runs the apparatus for training a neural network, units in the apparatus for training a neural network according to any one of the embodiments of the present disclosure are run.

A computer program provided according to a seventh aspect of the present disclosure includes a computer-readable code, where when the computer-readable code is running on a device, a processor in the device executes instructions for implementing each step of the method for detecting an object according to any one of the embodiments of the present disclosure; or when the computer-readable code is running on a device, a processor in the device executes instructions for implementing each step of the method for training a neural network according to any one of the embodiments of the present disclosure.

A computer-readable storage medium provided according to an eighth aspect of the present disclosure is configured to store computer-readable instructions, where when the instructions are executed, the operation in each step of the method for detecting an object according to any one of the embodiments of the present disclosure, or the operation in each step of the method for training a neural network according to any one of the embodiments of the present disclosure is implemented.

According to the object detection solution and the neural network training technical solution provided by the present disclosure, a plurality of fusion feature maps is predicted and obtained from a to-be-processed image by a deep convolutional neural network for target area frame detection, where a plurality of first feature maps is obtained from a first sub-network having at least one down-sampling layer; a plurality of second feature maps is obtained from a second sub-network having at least one up-sampling layer; and the plurality of first feature maps and the plurality of second feature maps are separately fused to obtain the fusion feature maps, and then target area frame data is obtained according to the plurality of fusion feature maps. Since these fusion feature maps represent high-level semantic features (e.g., layout, foreground information) and low-level detail features (e.g., small object information) in an image in a good way, the target area frame data of big and small objects included in the image can be effectively extracted according to these fusion feature maps, so as to improve accuracy and robustness of object detection.

The following further describes in detail the technical solutions of the present disclosure with reference to the accompanying drawings and embodiments.

BRIEF DESCRIPTION OF DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
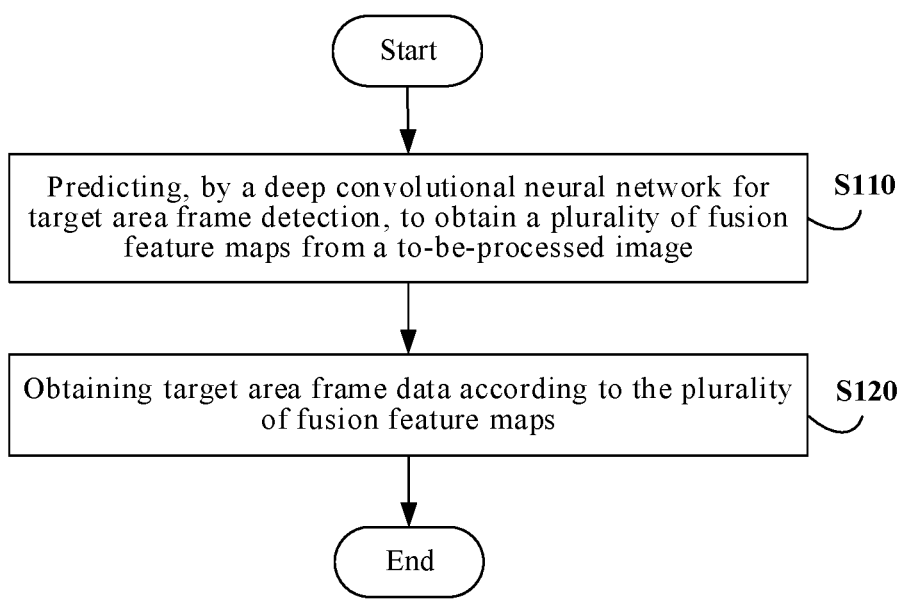
FIG. 1 is a flowchart illustrating a method for detecting an object according to an embodiment of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The present disclosure may be applied to computer systems/servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems.

The computer systems/servers may be described in the general context of computer system executable instructions (for example, program modules) executed by the computer system. Generally, the program modules may include routines, programs, target programs, components, logics, and data structures, to execute specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

The target area frame detection is executed by a network structure provided by the prior art, as a result, information in a feature map obtained from the upper layer in the convolutional neural network cannot be effectively utilized to assist in processing information of an underlying network, so that the feature data acquired from the network does not have sufficient representativeness and robustness, which is not beneficial to the detection of small objects.

The following describes the object detection technical solution provided by the present disclosure with reference to FIGS. 1-13. Any clustering technical solution provided by the present disclosure can be exampled by software, or hardware, or a combination of software and hardware. For example, the clustering technical solution provided by the present disclosure can be implemented by a certain electronic device or a certain processor, which is not limited in the present disclosure. The electronic device may include, but is not limited to, a terminal or a server. The processor may include, but is not limited to, a CPU or a GPU, and the details are not described below.

FIG. 1 is a flowchart illustrating a method for detecting an object according to an embodiment of the present disclosure.

With reference to FIG. 1, the method for detecting an object in this embodiment includes the following steps:

Step S110, a plurality of fusion feature maps is predicted and obtained from a to-be-processed image by a deep convolutional neural network for target area frame detection.

In an optional example, step S110 may be executed by a processor by invoking an instruction stored in a memory, or may be executed by a fusion feature map prediction module 810 run by the processor.

The deep convolutional neural network includes a first sub-network and a second sub-network; the first sub-network has at least one down-sampling layer, and the second sub-network has at least one up-sampling layer. The fusion feature maps are obtained through a first feature map and a second feature map; and the first feature map is obtained from the first sub-network, and the second feature map is obtained from the second sub-network.

The to-be-processed image in the embodiment of the present disclosure is a photo or video frame image taken with one or more object items. The image should meet certain resolution requirements, so that the captured object item can be distinguished at least through the naked eye.

The first sub-network in the deep convolutional neural network for target area frame detection can obtains first feature maps of the image from a plurality of convolution layers in different depths of the first sub-network by convoluting and pooling the to-be-processed image, these first feature maps representing the features of area frames of different sizes. In the first sub-network having at least one down-sampling layer, the first feature maps obtained at shallow convolution layers can present the details of the image well; the shallow convolution layers generally refer to the convolution layers positioned front in the deep convolutional neural network, but it difficult to distinguish the foreground from the background. Moreover, the first feature maps obtained at deeper convolution layers can extract the overall semantic features in an image in a good way; the deeper convolution layers generally refers to the convolution layers positioned behind in the deep convolutional neural network, but the detailed information of the image may be lost, e.g., small object information.

The second sub-network having at least one up-sampling layer performs reverse processing on the first feature maps obtained from the tail end of the first sub-network, i.e., deconvolution, up-sampling, and pooling operations, the first feature maps obtained from the tail end of the first sub-network are gradually enlarged, and second feature maps corresponding to the first feature maps are obtained to a plurality of convolution layers of different depths of the second sub-network. Because the second feature maps are deconvoluted and up-sampled by the deconvoluted and down-sampled first feature maps, in this process, the high-level semantic features are deconvoluted gradually to be combined with the low-level detail features to assist in recognizing small objects (area frames of the small objects).

Hence, the image processing approach executed by the first sub-network and the second sub-network forms a hourglass structure, and the first feature maps generated by the first convolution layer of the first sub-network are gradually decreased through down-sampling; and the first feature maps generated at the tail end of the first sub-network are gradually enlarged through the second convolution layer and the up-sampling layer of the second sub-network.

On this basis, at least one first feature map and corresponding second feature map are fused to obtain a plurality of fusion feature maps; these fusion feature maps can represent the high-level semantic features and low-level detail features in an image in a good way to recognize the object area frames of different sizes.

Step S120, target area frame data is obtained according to the plurality of fusion feature maps.

In an optional example, step S120 may be executed by a processor by invoking an instruction stored in a memory, or may be executed by a target area frame prediction module 820 run by the processor.

Specifically, the target area frame data can be extracted from at least one fusion feature map, and the target area frame data extracted from at least one fusion feature map is integrated to serve as target area frame data detected from the to-be-processed image.

According to the method for detecting an object of an embodiment of the present disclosure, a plurality of fusion feature maps is predicted and obtained from a to-be-processed image by a deep convolutional neural network for target area frame detection, where a plurality of first feature maps is obtained from a first sub-network having at least one down-sampling layer; a plurality of second feature maps is obtained from a second sub-network having at least one up-sampling layer; and the plurality of first feature maps and the plurality of second feature maps are separately fused to obtain the fusion feature maps, and then target area frame data is obtained according to the plurality of fusion feature maps. Since these fusion feature maps represent high-level semantic features (e.g., layout, foreground information) and low-level detail features (e.g., small object information) in an image in a good way, the target area frame data of big and small objects included in the image can be effectively extracted according to these fusion feature maps, so as to improve accuracy and robustness of object detection.

Figure 2:
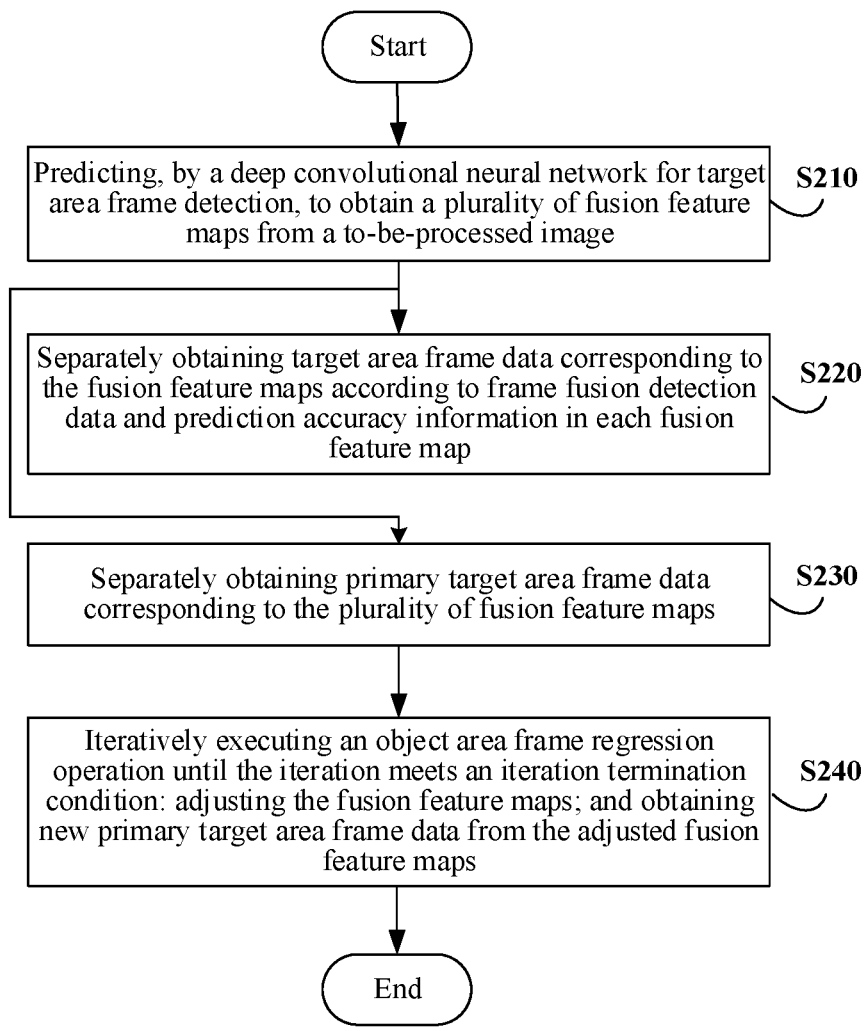
FIG. 2 is a flowchart illustrating a method for detecting an object according to another embodiment of the present disclosure.

FIG. 2 is a flowchart illustrating a method for detecting an object according to another embodiment of the present disclosure.

With reference to FIG. 2, in step S210, a plurality of fusion feature maps is predicted and obtained from a to-be-processed image by a deep convolutional neural network for target area frame detection.

In an optional example, step S210 may be executed by a processor by invoking an instruction stored in a memory, or may be executed by a fusion feature map prediction module 810 run by the processor.

Specifically, in the deep convolutional neural network, the first sub-network has a plurality of first convolution layers and at least one down-sampling layer; the down-sampling layer is provided between the plurality of first convolution layers; the second sub-network has a plurality of second convolution layers and at least one up-sampling layer; the up-sampling layer is provided between the plurality of second convolution layers; the second sub-network is provided at the tail end of the first sub-network; the first convolution layers and the second convolution layers are provided symmetrically; and the at least one down-sampling layer and the at least one up-sampling layer are symmetrically provided, separately.

A plurality of first feature maps of the image can be obtained from a plurality of first convolution layers of different depths in the first sub-network, and a plurality of second feature maps of the image can be obtained from a plurality of second convolution layers in the second sub-network symmetrical to the plurality of first convolution layers.

In one or more embodiments of the present disclosure, the at least one first convolution layer is provided with a first output branch for outputting the first feature map, and the second convolution layer is provided with a second output branch for outputting the second feature map.

According to an optional implementation of the present disclosure, the second sub-network further has a plurality of third convolution layers, and an input of the third convolution layer includes the first output branch and the second output branch. Accordingly, the fusion feature maps are obtained from output ends of the plurality of third convolution layers, separately.

Any deep convolutional neural network having the foregoing structure can be used. In one or more embodiments of the present disclosure, both the first sub-network and the second sub-network are constructed as Inception-BN network structures of better performance in the object detection. The Inception-BN network structure is good at extracting different structures/patterns from the image, and therefore is suitable for executing the task functions of the first sub-network and the second sub-network.

Figure 3:
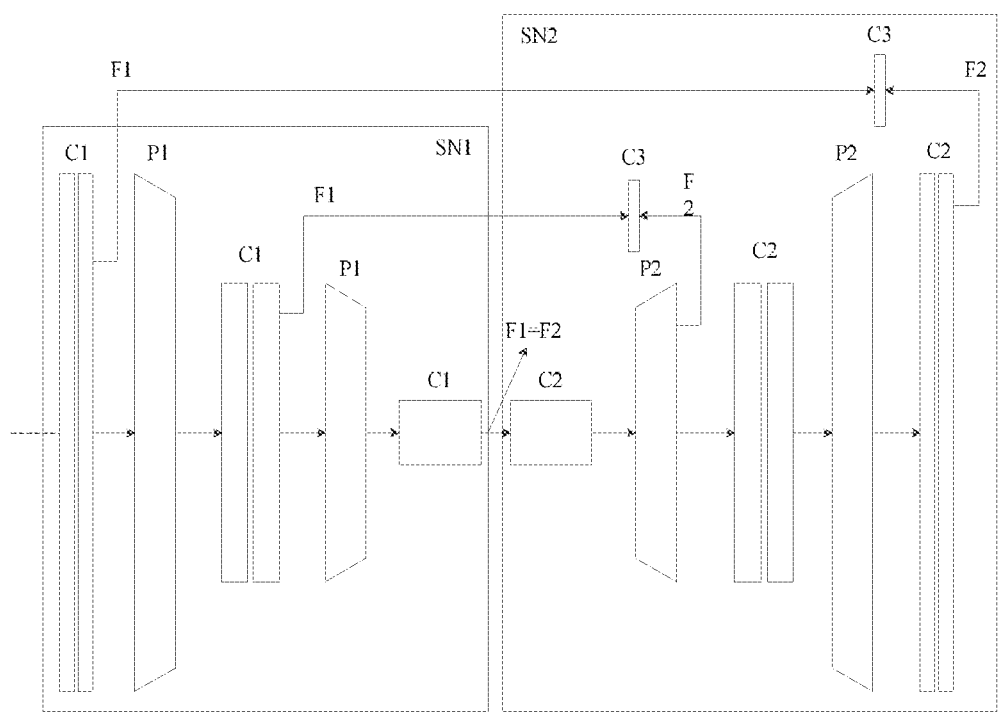
FIG. 3 illustrates an exemplary structure of a deep convolutional neural network according to an embodiment of the present disclosure.

FIG. 3 illustrates an exemplary structure of a deep convolutional neural network according to an embodiment of the present disclosure.

With reference to FIG. 3, the deep convolutional neural network according to this embodiment includes a first sub-network SN1 and a second sub-network SN2. The first sub-network SN1 has a plurality of first convolution layers C1 and at least one down-sampling layer P1 provided between the plurality of first convolution layers C1; the second sub-network SN2 has a plurality of second convolution layers C2 and at least one up-sampling layer P2 provided between the plurality of second convolution layers C2; the down-sampling layer P1 and the up-sampling layer P2 are provided symmetrically; and the plurality of first convolution layers C1 and the plurality of second convolution layers C2 are also provided symmetrically. In addition, the plurality of first convolution layers C1 are provided with a first output branch F1; and the plurality of second convolution layers C2 are provided with a first output branch F2. The second sub-network SN2 is further provided with a plurality of third convolution layers C3, and the fusion feature maps are output from the plurality of third convolution layers C3.

According to an optional implementation of the present disclosure, at least one point in the fusion feature map has frame fusion detection data and prediction accuracy information corresponding to a plurality of object detection frames. That is to say, information about object detection frames for object area frame detection, e.g., a convolution parameter or feature parameter, is provided at the first convolution layer and the second convolution layer, separately. The information about the object detection frames provided in the first convolution layer and the second convolution layer of different depths corresponds to two or more object detection frame sets, separately; the two or more object detection frame sets separately includes object detection frames of different sizes and ranges to obtain feature data of the object area frames of different sizes at different depths of the deep convolutional neural network.

The frame fusion detection data of at least one point in the fusion feature map may include, but is not limited to, for example, coordinate data, location and size data corresponding to the object detection frames in the object detection frame set. The prediction accuracy information may be confidence data of the frame fusion detection data, such as prediction accurate probability. For example, each point in the fusion feature map may have one, three, six, or nine coordinate data corresponding to the object detection frame, and the confidence data of the coordinate data.

Accordingly, according to an optional implementation of the present disclosure, step S220 is executed after step S210.

Step 220, target area frame data corresponding to the fusion feature maps is obtained according to the frame fusion detection data and prediction accuracy information in at least one fusion feature map, separately.

In an optional example, step S220 may be executed by a processor by invoking an instruction stored in a memory, or may be executed by the processor.

Specifically, the target area frame data may be obtained according to the prediction accuracy information of the frame fusion detection data of at least one point in the fusion feature map. For example, if the confidence of certain frame coordinate data of a certain point is greater than a predetermined threshold (e.g., 60%, 70%), an area frame corresponding to the frame coordinate data is determined at one of the target area frame data.

According to another optional implementation of the present disclosure, steps S230 and S240 are executed after step S210 is executed.

Step S230, primary target area frame data corresponding to the fusion feature maps is obtained separately.

In an optional example, step S230 may be executed by a processor by invoking an instruction stored in a memory, or may be executed by the processor.

For example, processing similar to the foregoing step S220 or S120 is executed to obtained the primary target area frame data, i.e., the target area frame data obtained in the foregoing step S220 or S120 is used as the primary target area frame data in step S230 for further adjustment and correction to improve the accuracy of object area frame detection.

Step S240, the following object area frame regression operation is iteratively executed until the iteration meets an iteration termination condition: adjusting the fusion feature maps; and obtaining new primary target area frame data from the adjusted fusion feature maps.

In an optional example, step S240 may be executed by a processor by invoking an instruction stored in a memory, or may be executed by the processor.

That is to say, the primary target area frame data is separately adjusted by adjusting each fusion feature map, and then new primary target area frame data is separately obtained by the adjusted fusion feature map, so as to regress (the object area frame regression operation) the primary target area frame to obtain more accurate new primary target area frame data.

In this step, such object area frame regression operation is iteratively executed until the iteration meets an iteration termination condition to finally obtain more accurate primary target area frame data. The iteration termination condition can be set as needed, e.g., a predetermined number of iterations, and an adjusted value (i.e., frame regression) between the new primary target area frame data and the unadjusted primary target area frame data is less than a predetermined frame regression value.

After the iteration in step S240 is completed, the primary target area frame data obtained through iteration is used as the target area frame data in the to-be-processed image.

According to the method for detecting an object of another embodiment of the present disclosure, a plurality of first feature maps of the to-be-processed image convoluted and down-sampled step by step is obtained from a plurality of first convolution layers of the first sub-network by a deep convolutional neural network having a symmetrical structure for target area frame detection; then a plurality of corresponding second feature maps deconvoluted and up-sampled step by step of the first feature maps obtained at the tail end of the first sub-network is obtained from a plurality of symmetrical second convolution layers of the second sub-network; the plurality of first feature maps and the corresponding second feature maps are convoluted to obtain a fusion feature map that represents the high-level semantic feature (e.g., layout, foreground information) and low-level detail features in an image in a good way, so as to effectively extract the target area frame data of big and small objects included in the image according to these fusion feature maps.

On this basis, new primary target area frame data is obtained from the adjusted fusion feature maps by adjusting the plurality of fusion feature maps, so as to iteratively regress the primary target area frame data. The target area frame data is repeatedly regressed and adjusted, so as to detect the more accurate target area frame data of included big and small objects more accurately, to further improve accuracy and robustness of object detection.

Figure 4:
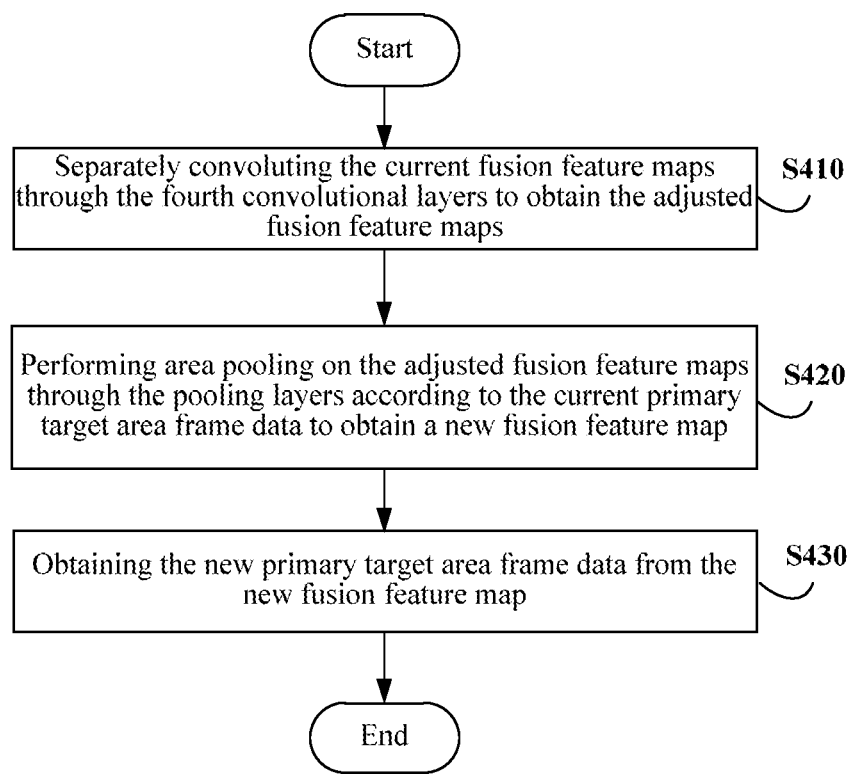
FIG. 4 is a flowchart illustrating a method for detecting an object according to still another embodiment of the present disclosure.

FIG. 4 is a flowchart illustrating a method for detecting an object according to still another embodiment of the present disclosure. This embodiment describes an exemplary object area frame regression operation in the foregoing step S240.

The deep convolutional neural network according to this embodiment further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

That is to say, each group of fourth convolutional layers may include one or more convolutional layers; and each group of fourth convolutional layers may be connected to an output end of the foregoing third convolutional layer, and the fusion feature maps are received as an input. Each pooling layer is provided at the tail end of corresponding fourth convolutional layer, and the adjusted fusion feature maps and the primary target area frame data are received as an input.

Each group of fourth convolutional layers is configured to convolute the fusion feature maps obtained from the third convolutional layers to obtain the adjusted fusion feature maps. In this process, the primary target area frame data obtained from the fusion feature maps is adjusted. The pooling layers in the third sub-network are configured to perform area pooling on the adjusted fusion feature maps obtained through the fourth convolutional layers to obtain new fusion feature maps, so that new primary target area frame data may be obtained from the new fusion feature maps.

Specifically, the object area frame regression operation for each iteration involves a plurality of fusion feature maps and primary target area frame data at the beginning of the current iteration, and also involves a plurality of new fusion feature maps and new primary area frame data obtained at the end of each iteration.

In step S410, the current fusion feature map is convoluted through the fourth convolution layers separately to obtain the adjusted fusion feature map so as to adjust the current primary target area frame, and the adjustment includes adjusting the location and/or size of the primary target area frame.

In an optional example, step S410 may be executed by a processor by invoking corresponding instruction stored in a memory, or may be executed by a frame adjusting unit 821 run by the processor.

In step S420, area pooling is performed on the adjusted fusion feature maps through the pooling layers according to the current primary target area frame data to obtain a new fusion feature map.

In an optional example, step S420 may be executed by a processor by invoking corresponding instruction stored in a memory, or may be executed by an area pooling unit 822 run by the processor.

That is to say, the current primary target area frame is used as an area of interest, and area pooling is performed on the adjusted fusion feature map to obtain a new fusion feature map.

A new fusion feature map reflecting the response degree to the adjusted target area frame is obtained by performing area pooling on the adjusted fusion feature map according to the current primary target area frame data, to facilitate subsequently obtaining new primary target area frame data from the new fusion feature map.

In step S430, the new primary target area frame data is obtained from the new fusion feature map to achieve regression of the target area frame so that the adjusted target area frame is closer to the ground truth of the object area frame. The processing in step S430 may be executed by the processing similar to step S120 or S220.

In an optional example, step S430 may be executed by a processor by invoking corresponding instruction stored in a memory, or may be executed by a primary frame obtaining unit 823 run by the processor.

According to an optional implementation of the present disclosure, the third sub-network further has a fifth convolution layer provided at an output end of the pooling layer. Accordingly, step S430 specifically includes: performing normalized convolution on the new fusion feature map through the fifth convolution layer; and obtaining the new primary target area frame data from the fusion feature map subjected to normalized convolution.

Any convolutional neural network having the foregoing structure can be used to construct the third sub-network. In one or more embodiments of the present disclosure, the third sub-network is constructed into a ResNet structure of better performance in the newly developed object detection technology to execute area pooling and normalized convolution.

According to the method for detecting an object in the foregoing embodiment of the present disclosure, on the basis of the foregoing embodiments, the primary target area frame data included in the fusion feature map is adjusted by further convoluting at least one fusion feature map and is then subjected to area pooling to obtain a new fusion feature map, and new primary target area frame data is obtained from the new fusion feature map, so as to adjust and regress the predicted primary target area frame data, which is beneficial to improve accuracy and robustness of object detection.

Figure 5:
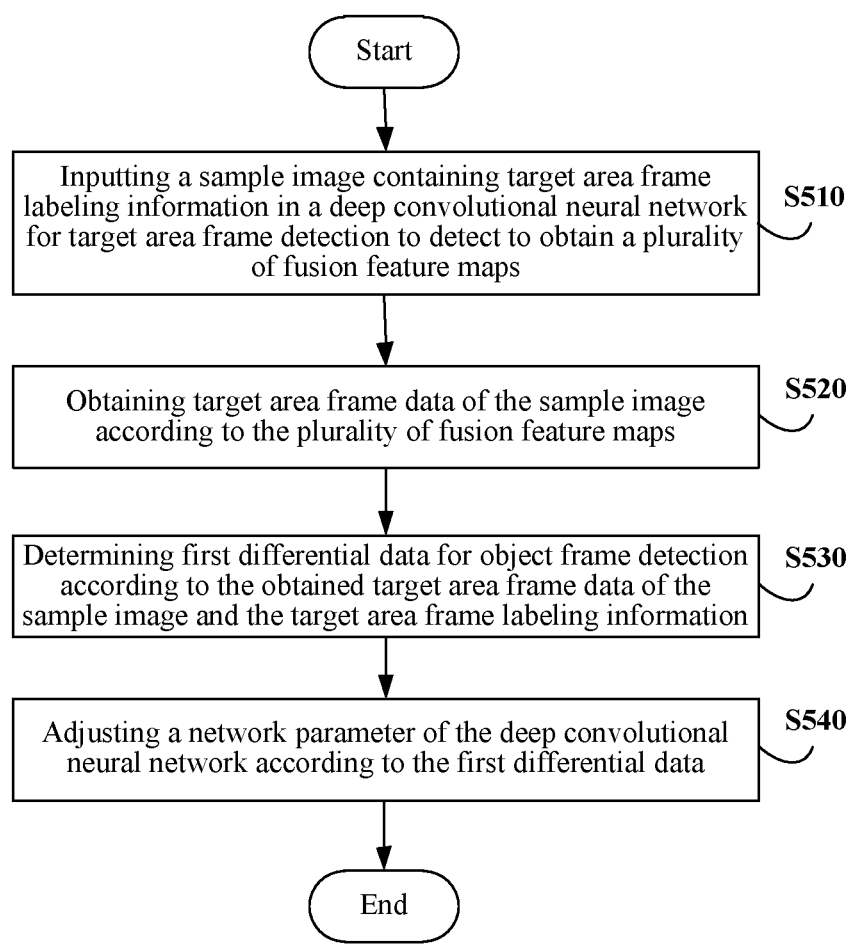
FIG. 5 is a flowchart illustrating a method for training a neural network according to an embodiment of the present disclosure.

FIG. 5 is a flowchart illustrating a method for training a neural network according to an embodiment of the present disclosure.

With reference to FIG. 5, in step S510, a sample image containing target area frame labeling information is input in a deep convolutional neural network for target area frame detection to detect to obtain a plurality of fusion feature maps.

In an optional example, step S510 may be executed by a processor by invoking corresponding instruction stored in a memory, or may be executed by a fusion feature map detection module 1010 run by the processor.

As previously mentioned, the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network.

A plurality of fusion feature maps may be detected and obtained from the sample image containing target area frame labeling information by using the deep convolutional neural network.

The processing in step S510 is executed on a plurality of sample images to detect to obtain a plurality of fusion feature maps for at least one sample image.

Step S520, target area frame data of the sample image is obtained according to a plurality of fusion feature maps.

In an optional example, step S520 may be executed by a processor by invoking corresponding instruction stored in a memory, or may be executed by a target area frame detection module 1020 run by the processor.

The processing in step S520 is similar to the processing in step S120, and the details are not described herein.

Step S530, first differential data for object frame detection is determined according to the obtained target area frame data of the sample image and the target area frame labeling information.

In an optional example, step S530 may be executed by a processor by invoking corresponding instruction stored in a memory, or may be executed by a first difference obtaining module 1030 run by the processor.

For example, a loss value or deviation value is calculated according to the obtained target area frame data of the sample image and the target area frame labeling information as the first differential data to serve as the basis of subsequently training the deep convolutional neural network.

In step S540, a network parameter of the deep convolutional neural network is adjusted according to the first differential data.

In an optional example, step S540 may be executed by a processor by invoking corresponding instruction stored in a memory, or may be executed by a first network training module 1040 run by the processor.

For example, the determined first differential data is back-propagated to the deep convolutional neural network to adjust the network parameter of the deep convolutional neural network.

According to the method for training a neural network provided by the present disclosure, a sample image containing target area frame labeling information is input in a deep convolutional neural network for target area frame detection to detect to obtain a plurality of fusion feature maps, where a plurality of first feature maps is detected and obtained from the first sub-network having at least one down-sampling layer; a plurality of second feature maps is detected and obtained from the second sub-network having at least one up-sampling layer; the plurality of first feature maps and the plurality of second feature maps are fused to obtain the fusion feature maps; and the target area frame data is obtained according to the plurality of fusion feature maps; then the first differential data is determined according to the obtained target area frame data and the target area frame labeling information; and the network parameter of the deep convolutional neural network is adjusted according to the first differential data. Since these fusion feature maps of the trained deep convolutional neural network represent high-level semantic features (e.g., layout, foreground information) and low-level detail features (e.g., small object information) in an image in a good way, the target area frame data of big and small objects included in the image can be effectively extracted according to these fusion feature maps, and therefore, the trained deep convolutional neural network can improve accuracy and robustness of object detection.

Figure 6:
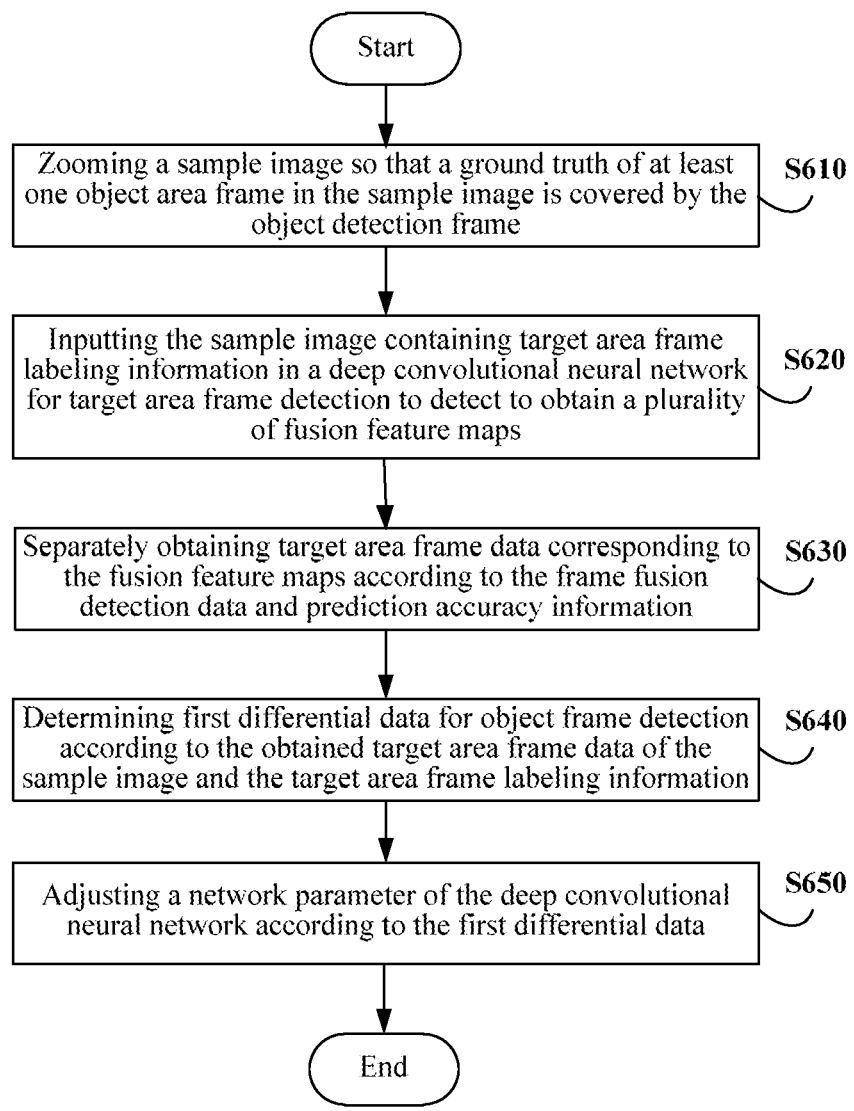
FIG. 6 is a flowchart illustrating a method for training a neural network according to another embodiment of the present disclosure.

FIG. 6 is a flowchart illustrating a method for training a neural network according to another embodiment of the present disclosure.

According to this embodiment, in the trained deep convolutional neural network, the second sub-network is provided at the tail end of the first sub-network; the first sub-network has a plurality of first convolution layers and at least one down-sampling layer; the down-sampling layer is provided between the plurality of first convolution layers; the second sub-network has a plurality of second convolution layers and at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

On this basis, in one or more embodiments of the present disclosure, the at least one first convolution layer is provided with a first output branch for outputting the first feature map, and the second convolution layer is provided with a second output branch for outputting the second feature map.

Therefore, in one or more embodiments of the present disclosure, the second sub-network further has a plurality of third convolution layers, and an input of the third convolution layer includes the first output branch and the second output branch. Accordingly, the third convolution layers are configured to convolute the first feature maps and corresponding second feature maps from the first output branch and the second output branch to obtain corresponding fusion feature maps.

With reference to FIG. 6, in step S610, the sample image is zoomed so that a ground truth of at least one object area frame in the sample image is covered by the object detection frame. In this way, it can be ensured that a positive sample exists in any bulk of sample images.

In addition, in one or more embodiments of the present disclosure, a sufficient number of positive samples are selected, and a certain number of negative samples are selected so that the trained first sub-network and second sub-network can be converged better.

Here, the positive sample is the possible sample area frame, and the negative sample is the negative sample area frame. The possible sample area frame and the negative sample area frame may be defined. According to the following criteria: the overlapping ratio of the positive sample area frame to the ground truth of the object area frame is not less than a first overlapping ratio value; the overlapping ratio of the negative sample area frame to the ground truth of the object area frame is not greater than a second overlapping ratio value; and the first overlapping ratio value is greater than the second overlapping ratio value.

Accordingly, According to an optional implementation of the present disclosure, the target area frame labeling information of the sample image includes labeling information of the positive sample area frame and labeling information of the negative sample area frame.

Here, the first overlapping ratio value may be set according to design requirements, for example, the first overlapping ratio value is set as any ratio value between 70% and 95%, and the second overlapping ratio value is set as any ratio value between 0 and 30% or between 0 and 25%.

In addition, a neutral sample, i.e., a neutral sample area frame may also be set. Specifically, the neutral sample area frame may be defined According to the following criteria: the overlapping ratio of the neutral sample area frame to the ground truth of the object area frame is between the first overlapping ratio value and the second overlapping ratio value, e.g., between 30% and 70%, and between 25% and 80%.

Furthermore, for example, the numbers of the positive samples, the negative samples and the neutral samples are controlled according to the following modes: in all the sample images, the proportion of a sum of the labeled positive sample area frames in the total number of frames of the positive sample area frames, the negative same area frames and the neutral sample area frames is not less than a predetermined first ratio, the first ratio is greater than 50%; the proportion of a sum of the labeled negative sample area frames in the total number of frames is not greater than a predetermined second ratio; and the proportion of a sum of the labeled neutral sample area frames in the total number of frames is not greater than a predetermined third ratio, the third ratio is not greater than half of the sum of the first ratio and the second ratio. Moderately using the neutral sample image is beneficial to distinguish the positive sample from the negative sample better to improve the robustness of the trained third sub-network.

In step S620, a sample image containing target area frame labeling information is input in a deep convolutional neural network for target area frame detection to detect to obtain a plurality of fusion feature maps, where the fusion feature maps are obtained from output ends of a plurality of third convolution layers, separately.

In an optional example, step S620 may be executed by a processor by invoking an instruction stored in a memory.

In one or more embodiments of the present disclosure, the frame fusion detection data of at least one point in the fusion feature map may include, but is not limited to, for example, coordinate data, location and size data corresponding to the object detection frames in the object detection frame set. The prediction accuracy information may be confidence data of the frame fusion detection data, such as prediction accurate probability.

Any deep convolutional neural network having the foregoing structure can be used. In one or more embodiments of the present disclosure, both the first sub-network and the second sub-network are constructed as Inception-BN network structures of better performance in the object detection.

In one or more embodiments of the present disclosure, the frame fusion detection data of at least one point in the fusion feature map may include, but is not limited to, for example, coordinate data, location and size data corresponding to the object detection frames in the object detection frame set. The prediction accuracy information may be confidence data of the frame fusion detection data, such as prediction accurate probability.

Accordingly, in step S630, target area frame data corresponding to the fusion feature maps is obtained according to the frame fusion detection data and prediction accuracy information in the at least one fusion feature map separately.

In an optional example, step S630 may be executed by a processor by invoking an instruction stored in a memory.

Step S640: first differential data for object frame detection is determined according to the obtained target area frame data of the sample image and the target area frame labeling information.

In an optional example, step S640 may be executed by a processor by invoking an instruction stored in a memory.

For example, a loss value or deviation value is calculated according to the obtained target area frame data of the sample image and the target area frame labeling information as the first differential data to serve as the basis of subsequently training the deep convolutional neural network.

In step S650, a network parameter of the deep convolutional neural network is adjusted according to the first differential data.

In an optional example, step S650 may be executed by a processor by invoking an instruction stored in a memory.

The processing in steps S640 and S650 is similar to the processing in steps S530 and S540, and the details are not described herein.

According to the method for training a neural network of the present disclosure, a sample image containing target area frame labeling information is input in a deep convolutional neural network having a symmetrical structure for target area frame detection to detect to obtain a plurality of fusion feature maps, where a plurality of first feature maps is detected and obtained from the first sub-network having at least one down-sampling layer; a plurality of second feature maps is detected and obtained from the second sub-network having at least one up-sampling layer; the plurality of first feature maps and the plurality of second feature maps are fused to obtain the fusion feature maps; and the target area frame data is obtained according to the plurality of fusion feature maps; then the first differential data is determined according to the obtained target area frame data and the target area frame labeling information; and the network parameter of the deep convolutional neural network is adjusted according to the first differential data. Since these fusion feature maps of the trained deep convolutional neural network represent high-level semantic features (e.g., layout, foreground information) and low-level detail features (e.g., small object information) in an image in a good way, the target area frame data of big and small objects included in the image can be effectively extracted according to these fusion feature maps, and therefore, the trained deep convolutional neural network can improve accuracy and robustness of object detection.

Figure 7:
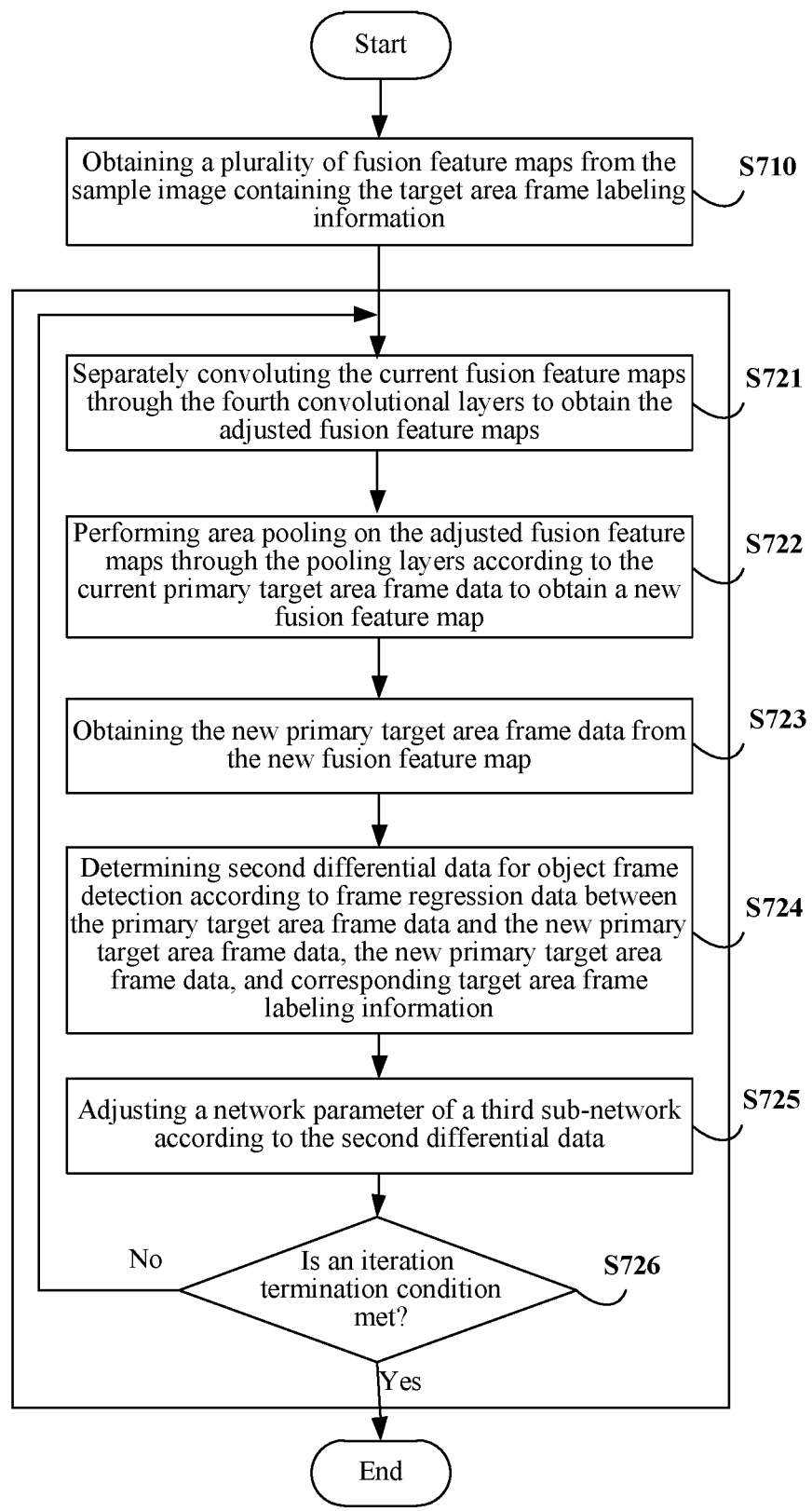
FIG. 7 is a flowchart illustrating a method for training a neural network according to still another embodiment of the present disclosure.

FIG. 7 is a flowchart illustrating a method for training a neural network according to still another embodiment of the present disclosure.

As previously mentioned, the deep convolutional neural network trained according to the foregoing embodiment further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

That is to say, each group of fourth convolutional layers may include one or more convolutional layers; and each group of fourth convolutional layers may be connected to an output end of the foregoing third convolutional layer, and the fusion feature maps are received as an input. Each pooling layer is provided at the tail end of corresponding fourth convolutional layer, and the adjusted fusion feature maps and the primary target area frame data are received as an input.

This embodiment mainly describes the training of the third sub-network in the deep convolutional neural network. The first sub-network and the second sub-network may be first trained through the method according to any one of the foregoing embodiments, and the third sub-network is trained using the fusion feature maps obtained from the training process of the first sub-network and the second sub-network according to the method of this embodiment.

With reference to FIG. 7, in step S710, a plurality of fusion feature maps is obtained from the sample image containing the target area frame labeling information.

As stated in step S510 or S610, the plurality of fusion feature maps is obtained from the sample image.

In an optional example, step S710 may be executed by a processor by invoking corresponding instruction stored in a memory, or may be executed by a fusion feature map detection module 1010 run by the processor. In step S720, the target area frame regression training operation is iteratively executed until the iteration meets an iteration termination condition.

In an optional example, step S720 may be executed by a processor by invoking corresponding instruction stored in a memory, or may be executed by a frame regression iterative training module 1050 run by the processor.

Specifically, step S720 includes steps S721 to S726.

In step S721, the current fusion feature map is convoluted through the fourth convolution layers separately to obtain the adjusted fusion feature map so as to achieve the objective of adjusting the current primary target area frame.

In step S722, area pooling is performed on the adjusted fusion feature map through the pooling layer according to the current primary target area frame data to obtain a new fusion feature map. The new fusion feature map includes adjustment of the primary target area frame and reflects the response degree to the adjusted target area frame.

In step S723, new primary target area frame data is obtained from the new fusion feature map.

The processing in steps S721 to S723 is similar to the processing in steps S410 to S430, and the details are not described herein.

According to an optional implementation of the present disclosure, the third sub-network further has a fifth convolution layer provided at an output end of the pooling layer. Accordingly, step S723 specifically includes: performing normalized convolution on the new fusion feature map through the fifth convolution layer; and obtaining the new primary target area frame data from the fusion feature map subjected to normalized convolution.

In step S724, second differential data for object frame detection is determined according to frame regression data between the unadjusted primary target area frame data and the new primary target area frame data, the new primary target area frame data, and corresponding target area frame labeling information.

In an optional example, step S724 may be executed by a processor by invoking corresponding instruction stored in a memory.

For example, a detection offset may be determined by new primary target area frame data and corresponding target area frame labeling information, and a loss value is calculated according to the detection offset and the frame regression data (i.e., frame movement/adjustment data) as the second differential data. Two offset parameters (the detection offset and the frame regression data) are synthesized as the second differential data for object frame detection, so as to improve the accuracy of the trained third sub-network.

In step S725, a network parameter of the third sub-network is adjusted according to the second differential data.

In an optional example, step S725 may be executed by a processor by invoking corresponding instruction stored in a memory.

For example, the determined second differential data is back-propagated to the third sub-network to adjust the network parameter of the third sub-network.

In step S726, whether the iteration termination condition is met is determined.

In an optional example, step S726 may be executed by a processor by invoking corresponding instruction stored in a memory.

If it is determined that the foregoing iteration meets an iteration termination condition (e.g., reaching the predetermined number of iterations) in step S726, the training of the third sub-network is ended; if it is determined that the foregoing iteration does not meet an iteration termination condition (e.g., reaching the predetermined number of iterations) in step S726, step S721 is executed again to continue training the third sub-network until it is determined that the iteration termination condition is met.

The existing training of a neural network for object area frame regression merely aims at executing the training of iterations (e.g., the number of iterations N) for one-step target area frame regression. Moreover, according to the method for training a neural network provided by the present disclosure, a plurality of regressions (e.g., the number of regressions M) is performed on the target area frame, each regression relating to the training of a plurality of iterations (e.g., the number of iterations N), i.e., relating to M*N iterative training. Therefore, the trained third sub-network is more accurate for the positioning detection of the target area frame.

Any convolutional neural network having the foregoing structure can be used to construct the third sub-network. In one or more embodiments of the present disclosure, the third sub-network is constructed into a ResNet structure of better performance in the newly developed object detection technology to execute area pooling and normalized convolution.

According to the method for training a neural network provided by the present disclosure, on the basis of the foregoing embodiments, the trained deep convolutional neural network adjusts the primary target area frame data included in the fusion feature map by further convoluting each fusion feature map of the sample image; then area pooling is performed to obtain a new fusion feature map, and new primary target area frame data is obtained from the new fusion feature map, so as to adjust and regress the obtained primary target area frame data, thereby improving accuracy and robustness of object detection.

Figure 8:
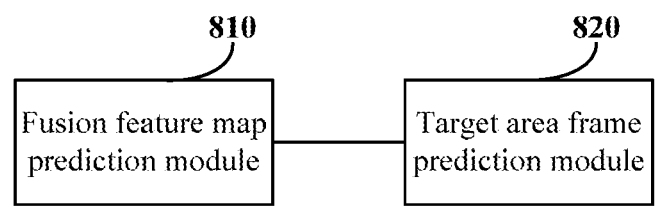
FIG. 8 is a structure block diagram illustrating an apparatus for detecting an object according to an embodiment of the present disclosure.

FIG. 8 is a structure block diagram illustrating an apparatus for detecting an object according to an embodiment of the present disclosure.

With reference to FIG. 8, the apparatus for detecting an object of this embodiment includes a fusion feature map prediction module 810 and a target area frame prediction module 820.

The fusion feature map prediction module 810 is configured to predict to obtain a plurality of fusion feature maps from a to-be-processed image through a deep convolutional neural network for target area frame detection, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network.

The target area frame prediction module 820 is configured to obtain target area frame data according to the plurality of fusion feature maps obtained by the fusion feature map prediction module 810.

The apparatus for detecting an object of this embodiment is configured to implement the corresponding method for detecting an object in the foregoing method embodiment, and has the advantageous effect of the corresponding method embodiment, and the details are not described herein again.

Figure 9:
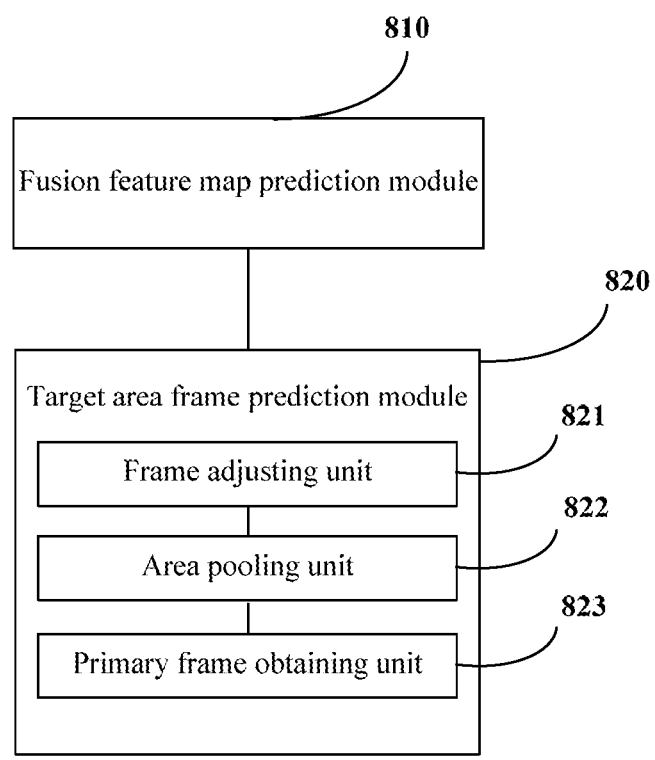
FIG. 9 is a structure block diagram illustrating an apparatus for detecting an object according to another embodiment of the present disclosure.

FIG. 9 is a structure block diagram illustrating an apparatus for detecting an object according to another embodiment of the present disclosure.

According to this embodiment, in the deep convolutional neural network for target area frame detection, the second sub-network is provided at the tail end of the first sub-network; the first sub-network has a plurality of first convolution layers and at least one down-sampling layer; the down-sampling layer is provided between the plurality of first convolution layers; the second sub-network has a plurality of second convolution layers and at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

According to an optional implementation, the at least one first convolution layer is provided with a first output branch for outputting the first feature map, and the second convolution layer is provided with a second output branch for outputting the second feature map.

According to an optional implementation, the second sub-network further has a plurality of third convolution layers, and an input of the third convolution layer includes the first output branch and the second output branch. Accordingly, the fusion feature map prediction module 810 is configured to separately obtain the fusion feature maps from output ends of the plurality of third convolution layers.

In one or more embodiments of the present disclosure, at least one point in the fusion feature map has frame fusion detection data and prediction accuracy information corresponding to a plurality of object detection frames. Accordingly, the target area frame prediction module 820 is configured to separately obtain target area frame data corresponding to the fusion feature maps according to the frame fusion detection data and prediction accuracy information in the at least one fusion feature map.

In one or more embodiments of the present disclosure, the target area frame prediction module 820 is configured to: separately obtain primary target area frame data corresponding to the fusion feature maps; iteratively execute the following object area frame regression operation until the iteration meets an iteration termination condition: adjusting the fusion feature maps; and obtaining new primary target area frame data from the adjusted fusion feature maps; and use the primary target area frame data obtained through the iteration as target area frame data in the to-be-processed image.

In one or more embodiments of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In one or more embodiments of the present disclosure, the target area frame prediction module 820 includes:

a frame adjusting unit 821, configured to separately convolute the current fusion feature maps through the fourth convolutional layers to obtain the adjusted fusion feature maps;

an area pooling unit 822, configured to perform area pooling on the adjusted fusion feature maps through the pooling layers according to the current primary target area frame data to obtain a new fusion feature map; and a primary frame obtaining unit 823, configured to obtain the new primary target area frame data from the new fusion feature map.

In one or more embodiments of the present disclosure, the third sub-network further has a fifth convolution layer provided at an output end of the pooling layer. Accordingly, the primary frame obtaining unit 823 is configured to perform normalized convolution on the new fusion feature map through the fifth convolution layer; and obtain the new primary target area frame data from the fusion feature map subjected to normalized convolution.

In one or more embodiments of the present disclosure, both the first sub-network and the second sub-network are Inception-BN network structures, and the third sub-network is a ResNet structure.

The apparatus for detecting an object of this embodiment is configured to implement the corresponding method for detecting an object in the foregoing method embodiment, and has the advantageous effect of the corresponding method embodiment, and the details are not described herein again.

Figure 10:
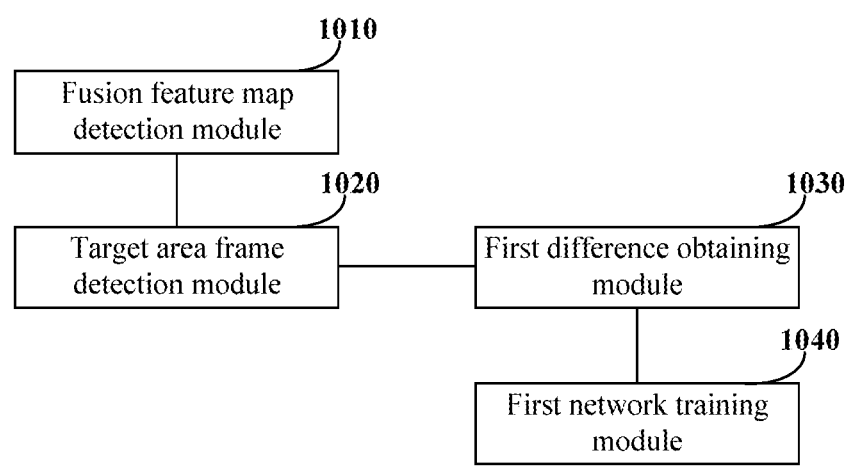
FIG. 10 is a structure block diagram illustrating an apparatus for training a neural network according to an embodiment of the present disclosure.

FIG. 10 is a structure block diagram illustrating an apparatus for training a neural network according to an embodiment of the present disclosure.

With reference to FIG. 10, the apparatus for training a neural network according to this embodiment includes a fusion feature map detection module 1010, a target area frame detection module 1020, a first difference obtaining module 1030, and a first network training module 1040.

The fusion feature map detection module 1010 is configured to input a sample image containing target area frame labeling information in a deep convolutional neural network for target area frame detection to detect to obtain a plurality of fusion feature maps, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network.

The target area frame detection module 1020 is configured to obtain target area frame data of the sample image according to the plurality of fusion feature maps.

The first difference obtaining module 1030 is configured to determine first differential data for object frame detection according to the obtained target area frame data of the sample image and the target area frame labeling information.

The first network training module 1040 is configured to adjust a network parameter of the deep convolutional neural network according to the first differential data.

The apparatus for training a neural network of this embodiment is configured to implement the corresponding method for training a neural network in the foregoing method embodiment, and has the advantageous effect of the corresponding method embodiment, and the details are not described herein again.

Figure 11:
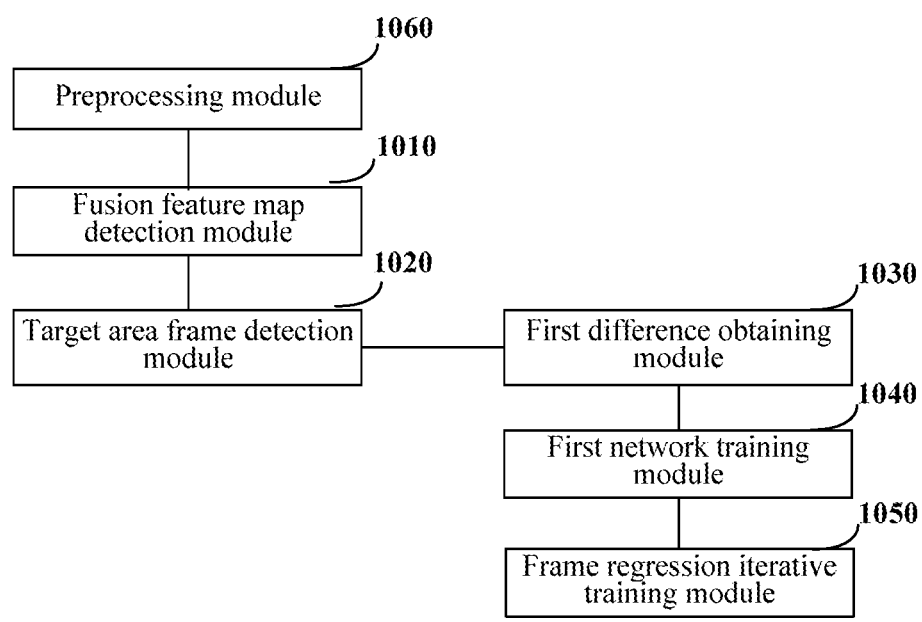
FIG. 11 is a structure block diagram illustrating an apparatus for training a neural network according to another embodiment of the present disclosure.

FIG. 11 is a structure block diagram illustrating an apparatus for training a neural network according to another embodiment of the present disclosure.

According to this embodiment, in the deep convolutional neural network for target area frame detection, the second sub-network is provided at the tail end of the first sub-network; the first sub-network has a plurality of first convolution layers and at least one down-sampling layer; the down-sampling layer is provided between the plurality of first convolution layers; the second sub-network has a plurality of second convolution layers and at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

According to an optional implementation, the at least one first convolution layer is provided with a first output branch for outputting the first feature map, and the second convolution layer is provided with a second output branch for outputting the second feature map.

According to an optional implementation, the second sub-network further has a plurality of third convolution layers, and an input of the third convolution layer includes the first output branch and the second output branch. Accordingly, the fusion feature map detection module 1010 is configured to separately obtain the fusion feature maps from output ends of the plurality of third convolution layers.

In one or more embodiments of the present disclosure, at least one point in the fusion feature map has frame fusion detection data and prediction accuracy information corresponding to a plurality of object detection frames.

In one or more embodiments of the present disclosure, the deep convolutional neural network further includes a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers includes the adjusted fusion feature maps and the primary target area frame data.

In one or more embodiments of the present disclosure, the foregoing apparatus further includes: a frame regression iterative training module 1050, configured to iteratively execute the following target area frame regression training operation until the iteration meets an iteration termination condition: separately convoluting the current fusion feature maps through the fourth convolutional layers to obtain the adjusted fusion feature maps; performing area pooling on the adjusted fusion feature maps through the pooling layers according to the current primary target area frame data to obtain a new fusion feature map; obtaining the new primary target area frame data from the new fusion feature map; determining second differential data for object frame detection according to frame regression data between the unadjusted primary target area frame data and the new primary target area frame data, the new primary target area frame data, and corresponding target area frame labeling information; and adjusting a network parameter of the third sub-network according to the second differential data.

In one or more embodiments of the present disclosure, the third sub-network further has a fifth convolution layer provided at an output end of the pooling layer. Accordingly, the frame regression iterative training module 1050 is configured to perform normalized convolution on the new fusion feature map through the fifth convolution layer; and obtain the new primary target area frame data from the fusion feature map subjected to normalized convolution.

In one or more embodiments of the present disclosure, the foregoing apparatus further includes: a preprocessing module 1060, configured to zoom, prior to iteratively executing the target area frame regression training operation, the sample image so that a ground truth of at least one object area frame is covered by the object detection frame.

In one or more embodiments of the present disclosure, the target area frame labeling information of the sample image includes labeling information of a positive sample area frame and labeling information of a negative sample area frame; the overlapping ratio of the positive sample area frame to the ground truth of the object area frame is not less than a first overlapping ratio value; the overlapping ratio of the negative sample area frame to the ground truth of the object area frame is not greater than a second overlapping ratio value; and the first overlapping ratio value is greater than the second overlapping ratio value.

In one or more embodiments of the present disclosure, the target area frame labeling information of the sample image further includes labeling information of a neutral sample area frame; and the overlapping ratio of the neutral sample area frame to the ground truth of the object area frame is between the first overlapping ratio value and the second overlapping ratio value.

In one or more embodiments of the present disclosure, in all the sample images, the proportion of a sum of the labeled positive sample area frames in the total number of frames of the positive sample area frames, the negative same area frames and the neutral sample area frames is not less than a predetermined first ratio, the first ratio is greater than 50%; the proportion of a sum of the labeled negative sample area frames in the total number of frames is not greater than a predetermined second ratio; and the proportion of a sum of the labeled neutral sample area frames in the total number of frames is not greater than a predetermined third ratio, the third ratio is not greater than half of the sum of the first ratio and the second ratio.

In one or more embodiments of the present disclosure, both the first sub-network and the second sub-network are Inception-BN network structures, and the third sub-network is a ResNet structure.

The apparatus for training a neural network of this embodiment is configured to implement the corresponding method for training a neural network in the foregoing method embodiment, and has the advantageous effect of the corresponding method embodiment, and the details are not described herein again.

In addition, embodiments of the present disclosure further provide an electronic device, including a processor and a memory;

the memory is configured to store at least one executable instruction, which enables the processor to execute the operation corresponding to the method for detecting an object according to any one of the foregoing embodiments of the present disclosure; or, the memory is configured to store at least one executable instruction, which enables the processor to execute the operation corresponding to the method for training a neural network according to any one of the foregoing embodiments of the present disclosure.

In addition, the embodiments of the present disclosure further provide another electronic device, including a processor and the apparatus for detecting an object according to any one of the foregoing embodiments of the present disclosure, where when the processor runs the apparatus for detecting an object, units in the apparatus for detecting an object according to any one of the foregoing embodiments of the present disclosure are run; or a processor and the apparatus for training a neural network according to any one of the foregoing embodiments of the present disclosure, where when the processor runs the apparatus for training a neural network, units in the apparatus for training a neural network according to any one of the foregoing embodiments of the present disclosure are run.

Figure 12:
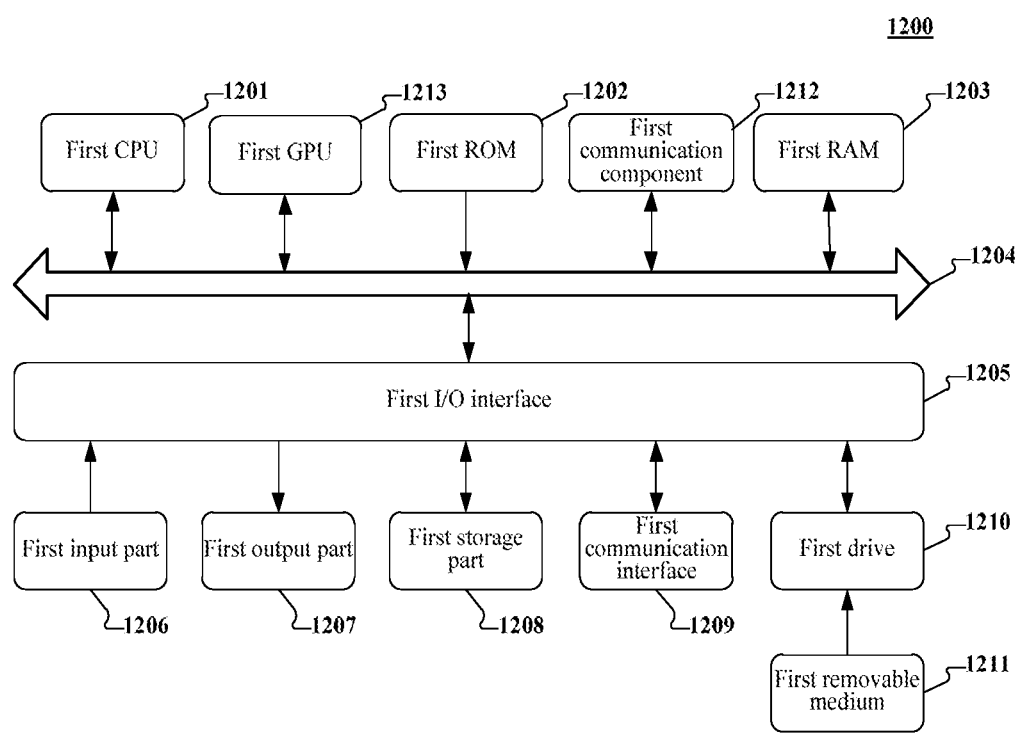
FIG. 12 is a schematic structural diagram illustrating a first electronic device according to an embodiment of the present disclosure.

FIG. 12 is a schematic structural diagram illustrating a first electronic device according to an embodiment of the present disclosure.

The present disclosure further provides an electronic device, for example, a mobile terminal, a Personal Computer (PC), a tablet computer, a server, etc. With reference to FIG. 12 below, FIG. 12 illustrates a schematic structural diagram of a first electronic device 1200 suitable for implementing a terminal device or a server of an embodiment of the present disclosure.

As shown in FIG. 12, the first electronic device 1200 includes, but is not limited to, one or more first processors and first communication units; the one or more first processors are, for example, one or more first Central Processing Units (CPUs) 1201, and/or one or more first Graphic Processing Units (GPUs) 1213; the first processors may execute various appropriate actions and processing according to executable instructions stored in a first Read Only Memory (ROM) 1202 or executable instructions loaded from a first memory portion 1208 into a first Random Access Memory (RAM) 1203. The first communication unit includes a first communication component 1212 and a first communication interface 1209. The first communication component 1212 may include, but is not limited to, a network card, which may include, but is not limited to, an IB (Infiniband) network card; and the first communication interface 1209 includes, for example, communication interfaces of an LAN card and a network interface card of a modem; and the first communication interface 1209 executes communication processing via a network such as the Internet.

The first processor may be in communication with the first ROM 1202 and/or the first RAM 1203 to execute the executable instructions, is connected to the first communication component 1212 through a first bus 1204, and is in communication with other target devices via the first communication component 1212, so as to complete operations corresponding to any method provided by the embodiments of the present disclosure, for example, a plurality of fusion feature maps is predicted and obtained from the to-be-processed image through the deep convolutional neural network for target area frame detection, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; the first feature map is obtained from the first sub-network, and the second feature map is obtained from the second sub-network; and the target area frame data is obtained according to the plurality of fusion feature maps.

In addition, the first RAM 1203 may further store various programs and data required during an operation of the apparatus. The first CPU 1201, the first ROM 1202, and the first RAM 1203 are connected to each other via the first bus 1204. In the presence of the first RAM 1203, the first ROM 1202 is an optional module. The first RAM 1203 stores executable instructions, or writes executable instructions to the first ROM 1202 during running. The executable instructions cause the first CPU 1201 to perform the operations corresponding to any one of the foregoing methods of the present disclosure. A first Input/Output (I/O) interface 1205 is also connected to the first bus 1204. The first communication component 1212 may be integrated, or may be set as having multiple sub-modules (for example, multiple IB network cards) separately connected to the bus.

The following components are connected to the first I/O interface 1205: a first input part 1206 including a keyboard, a mouse and the like; a first output part 1207 including, but is not limited to, a Cathode-Ray Tube (CRT), a Liquid Crystal Display (LCD), a speaker and the like; a first storage part 1208 including, but is not limited to, a hard disk and the like; and a first communication interface 1209 including, but is not limited to, an LAN card, a network interface card of a modem and the like. A first drive 1210 is also connected to the first I/O interface 1205 according to requirements. A first removable medium 1211 such as a magnetic disk, an optical disk, a magneto-optical disk, a semiconductor memory or the like is mounted on the first drive 1210 according to requirements, so that a computer program read from the removable medium may be installed on the first storage part 1208 according to requirements.

It should be noted that, the architecture shown in FIG. 12 is merely an optional implementation. During specific practice, a number and types of the components in FIG. 12 may be selected, decreased, increased, or replaced according to actual requirements. Different functional components may be separated or integrated or the like. For example, the GPU and the CPU may be separated, or the GPU may be integrated on the CPU, and the first communication unit 1212 may be separated from or integrated on the CPU or the GPU or the like. These alternative implementations all fall within the protection scope of the present disclosure.

Particularly, a process described above with reference to a flowchart according to an embodiment of the present disclosure may be implemented as a computer software program. For example, an embodiment of the present disclosure includes a computer program product, which includes a computer program tangibly included in a machine-readable medium. The computer program includes program codes for executing the method shown in the flowchart, the program codes may include instructions for correspondingly executing steps of the method provided by the embodiment of the present disclosure, e.g., an executable code for predicting and obtaining a plurality of fusion feature maps from the to-be-processed image through the deep convolutional neural network for target area frame detection, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; the first feature map is obtained from the first sub-network, and the second feature map is obtained from the second sub-network; and an executable code for obtaining the target area frame data according to the plurality of fusion feature maps. In such embodiment, the computer program is downloaded and installed from the network through the communication unit, and/or is installed from the first removable medium 1211. When executed by the first CPU 1201, the computer program executes the foregoing function defined in the method of the present disclosure.

According to the electronic device of the embodiments of the present disclosure, a plurality of fusion feature maps is predicted and obtained from a to-be-processed image by a deep convolutional neural network for target area frame detection, where a plurality of first feature maps is obtained from a first sub-network having at least one down-sampling layer; a plurality of second feature maps is obtained from a second sub-network having at least one up-sampling layer; and the plurality of first feature maps and the plurality of second feature maps are separately fused to obtain the fusion feature maps, and then target area frame data is obtained according to the plurality of fusion feature maps. Since these fusion feature maps represent high-level semantic features (e.g., layout, foreground information) and low-level detail features (e.g., small object information) in an image in a good way, the target area frame data of big and small objects included in the image can be effectively extracted according to these fusion feature maps, so as to improve accuracy and robustness of object detection.

Figure 13:
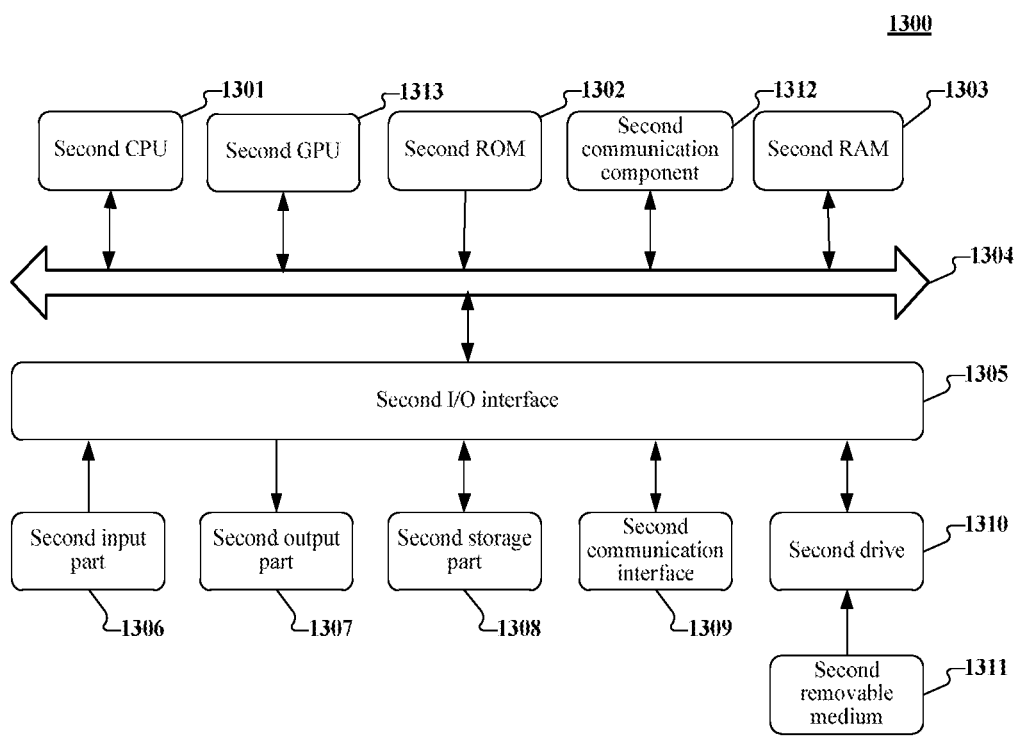
FIG. 13 is a schematic structural diagram illustrating a second electronic device according to another embodiment of the present disclosure.

FIG. 13 is a schematic structural diagram illustrating a second electronic device according to another embodiment of the present disclosure.

The present disclosure further provides an electronic device, for example, a mobile terminal, a PC, a tablet computer, a server, etc. With reference to FIG. 13 below, FIG. 13 illustrates a schematic structural diagram of a second electronic device 1300 applicable to implement the terminal device or server of the embodiments of the present disclosure.

As shown in FIG. 13, the second electronic device 1300 includes, but is not limited to, one or more second processors and second communication units; the one or more first processors are, for example, one or more second CPUs 1301, and/or one or more second GPUs 1313; the second processors may execute various appropriate actions and processing according to executable instructions stored in a second ROM 1302 or executable instructions loaded from a second memory portion 1308 into a second RAM 1303. The second communication unit includes a second communication component 1312 and a second communication interface 1309. The second communication component 1312 may include, but is not limited to, a network card, which may include, but is not limited to, an IB network card; and the second communication interface 1309 includes, for example, communication interfaces of an LAN card and a network interface card of a modem; and the second communication interface 1309 executes communication processing via a network such as the Internet.

The second processor may be in communication with the second ROM 1302 and/or the second RAM 1303 to execute the executable instructions, is connected to the second communication component 1312 through a second bus 1304, and is in communication with other target devices via the second communication component 1312, so as to complete operations corresponding to any method provided by the embodiments of the present disclosure, for example, a sample image containing target area frame labeling information is input in a deep convolutional neural network for target area frame detection to detect to obtain a plurality of fusion feature maps, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; the first feature map is obtained from the first sub-network, and the second feature map is obtained from the second sub-network; target area frame data of the sample image is obtained according to the plurality of fusion feature maps; first differential data for object frame detection is determined according to the obtained target area frame data of the sample image and the target area frame labeling information; and a network parameter of the deep convolutional neural network is adjusted according to the first differential data.

In addition, the second RAM 1303 may further store various programs and data required during an operation of the apparatus. The second CPU 1301, the second ROM 1302, and the second RAM 1303 are connected to each other via the second bus 1304. In the presence of the second RAM 1303, the second ROM 1302 is an optional module. The second RAM 1303 stores executable instructions, or writes executable instructions to the second ROM 1302 during running. The executable instructions cause the second CPU 1301 to perform the operations corresponding to any one of the foregoing methods of the present disclosure. A second I/O interface 1305 is also connected to the second bus 1304. The second communication component 1312 may be integrated, or may be set as having multiple sub-modules (for example, multiple IB network cards) separately connected to the bus.

The following components are connected to the second I/O interface 1305: a second input part 1306 including a keyboard, a mouse and the like; a second output part 1307 including, but is not limited to, a CRT, an LCD, a speaker and the like; a second storage part 1308 including, but is not limited to, a hard disk and the like; and a second communication interface 1309 including, but is not limited to, an LAN card, a network interface card of a modem and the like. A second drive 1310 is also connected to the second I/O interface 1305 according to requirements. A second removable medium 1311 such as a magnetic disk, an optical disk, a magneto-optical disk, a semiconductor memory or the like is mounted on the second drive 1310 according to requirements, so that a computer program read from the removable medium may be installed on the second storage part 1308 according to requirements.

It should be noted that, the architecture shown in FIG. 13 is merely an optional implementation. During specific practice, a number and types of the components in FIG. 13 may be selected, decreased, increased, or replaced according to actual requirements. Different functional components may be separated or integrated or the like. For example, the GPU and the CPU may be separated, or the GPU may be integrated on the CPU, and the second communication unit

1312 may be separated from or integrated on the CPU or the GPU or the like. These alternative implementations all fall within the protection scope of the present disclosure.

Particularly, a process described above with reference to a flowchart according to an embodiment of the present disclosure may be implemented as a computer software program. For example, an embodiment of the present disclosure includes a computer program product, which includes a computer program tangibly included in a machine-readable medium. The computer program includes program codes for executing the method shown in the flowchart, the program codes may include instructions for correspondingly executing steps of the method provided by the embodiment of the present disclosure, e.g., an executable code for inputting a sample image containing target area frame labeling information in a deep convolutional neural network for target area frame detection to detect to obtain a plurality of fusion feature maps, where the deep convolutional neural network includes a first sub-network and a second sub-network; the first sub-network has at least one down-sampling layer, and the second sub-network has at least one up-sampling layer; the fusion feature maps are obtained through a first feature map and a second feature map; the first feature map is obtained from the first sub-network, and the second feature map is obtained from the second sub-network; an executable code for obtaining the target area frame data of the sample image according to the plurality of fusion feature maps; an executable code for determining first differential data for object frame detection according to the obtained target area frame data of the sample image and the target area frame labeling information; and an executable code for adjusting a network parameter of the deep convolutional neural network according to the first differential data. In such embodiment, the computer program is downloaded and installed from the network through the communication unit, and/or is installed from the second removable medium 1311. When executed by the second CPU 1301, the computer program executes the foregoing function defined in the method of the present disclosure.

According to the electronic device provided by the present disclosure, a sample image containing target area frame labeling information is input in a deep convolutional neural network for target area frame detection to detect to obtain a plurality of fusion feature maps, where a plurality of first feature maps is detected and obtained from the first sub-network having at least one down-sampling layer; a plurality of second feature maps is detected and obtained from the second sub-network having at least one up-sampling layer; the plurality of first feature maps and the plurality of second feature maps are fused to obtain the fusion feature maps; and the target area frame data is obtained according to the plurality of fusion feature maps; then the first differential data is determined according to the obtained target area frame data and the target area frame labeling information; and the network parameter of the deep convolutional neural network is adjusted according to the first differential data. Since these fusion feature maps of the trained deep convolutional neural network represent high-level semantic features (e.g., layout, foreground information) and low-level detail features (e.g., small object information) in an image in a good way, the target area frame data of big and small objects included in the image can be effectively extracted according to these fusion feature maps, and therefore, the trained deep convolutional neural network can improve accuracy and robustness of object detection.

In addition, the embodiments of the present disclosure further provide a computer program, including a computer-readable code, where when the computer-readable code is running on a device, a processor in the device executes instructions for implementing each step of the method for detecting an object according to any one of the embodiments of the present disclosure; or when the computer-readable code is running on a device, a processor in the device executes instructions for implementing each step of the method for training a neural network according to any one of the embodiments of the present disclosure.

In addition, the embodiments of the present disclosure further provide a computer-readable storage medium, configured to store computer-readable instructions, where when the instructions are executed, the operation in each step of the method for detecting an object according to any one of the embodiments of the present disclosure, or the operation in each step of the method for training a neural network according to any one of the embodiments of the present disclosure is implemented. Various embodiments in this description are described in a progressive manner, emphasized descriptions of each embodiment may include a difference between this embodiment and another embodiment, and same or similar parts between the embodiments may be cross-referenced. For the system embodiment, since the system embodiment basically corresponds to the method embodiment, the description is relatively simple. For related parts, refer to related descriptions of the method embodiment.

The methods and the apparatuses of the present disclosure may be implemented in many manners. For example, the methods and apparatuses of the present disclosure may be implemented by using software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure may be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for detecting an object, comprising:
predicting, by a deep convolutional neural network for target area frame detection, to obtain a plurality of fusion feature maps from a to-be-processed image, wherein the deep convolutional neural network comprises a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; and
obtaining target area frame data according to the plurality of fusion feature maps,
wherein at least one point in the fusion feature map has frame fusion detection data and prediction accuracy information corresponding to a plurality of object detection frames;
the obtaining the target area frame data according to the plurality of fusion feature maps comprises:
separately obtaining target area frame data corresponding to the fusion feature maps according to the frame fusion detection data and prediction accuracy information in the at least one fusion feature map, wherein in response to that the prediction accuracy information of the frame fusion detection data of the at least one point in the fusion feature map is greater than a predetermined threshold, an area frame corresponding to the frame fusion detection data is determined as one of the target area frame data.

2. The method according to claim 1, wherein the second sub-network is provided at the tail end of the first sub-network; the first sub-network has a plurality of first convolution layers and the at least one down-sampling layer; the down-sampling layer is provided between the plurality of first convolution layers; the second sub-network has a plurality of second convolution layers and the at least one up-sampling layer; the up-sampling layer is provided between the plurality of second convolution layers; the first convolution layers and the second convolution layers are provided symmetrically; and the at least one down-sampling layer and the at least one up-sampling layer are symmetrically provided, separately.

3. The method according to claim 2, wherein the at least one first convolution layer is provided with a first output branch for outputting the first feature map, and the second convolution layer is provided with a second output branch for outputting the second feature map.

4. The method according to claim 3, wherein the second sub-network further has a plurality of third convolution layers, and an input of the third convolution layer comprises the first output branch and the second output branch;
the predicting to obtain the plurality of fusion feature maps comprises:
separately obtaining the fusion feature maps from output ends of the plurality of third convolution layers.

5. The method according to claim 1, wherein the obtaining the target area frame data according to the plurality of fusion feature maps comprises:
separately obtaining primary target area frame data corresponding to the fusion feature maps;
iteratively executing the following object area frame regression operation until the iteration meets an iteration termination condition: adjusting the fusion feature maps; and obtaining new primary target area frame data from the adjusted fusion feature maps; and
using the primary target area frame data obtained through the iteration as target area frame data in the to-be-processed image.

6. The method according to claim 5, wherein the deep convolutional neural network further comprises a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers comprises the adjusted fusion feature maps and the primary target area frame data.

7. The method according to claim 6, wherein the object area frame regression operation comprises:
separately convoluting the current fusion feature maps through the fourth convolutional layers to obtain the adjusted fusion feature maps;
performing area pooling on the adjusted fusion feature maps through the pooling layers according to the current primary target area frame data to obtain a new fusion feature map; and
obtaining the new primary target area frame data from the new fusion feature map.

8. The method according to claim 7, wherein the third sub-network further has a fifth convolution layer provided at an output end of the pooling layer;
the obtaining the new primary target area frame data from the new fusion feature map comprises:
performing normalized convolution on the new fusion feature map through the fifth convolution layer; and
obtaining the new primary target area frame data from the fusion feature map subjected to normalized convolution.

9. The method according to claim 6, wherein both the first sub-network and the second sub-network are Inception-Batch Normalization (Inception-BN) network structures, and the third sub-network is a Residual Network (ResNet) structure.

10. The method according to claim 1, further comprising:
training the deep convolutional neural network for target area frame detection by:
inputting a sample image containing target area frame labeling information in the deep convolutional neural network for target area frame detection to detect to obtain a plurality of fusion feature maps corresponding to the sample image;
obtaining target area frame data of the sample image according to the plurality of fusion feature maps corresponding to the sample image;
determining first differential data for object frame detection according to the obtained target area frame data of the sample image and the target area frame labeling information; and
adjusting a network parameter of the deep convolutional neural network according to the first differential data.

11. The method according to claim 10, wherein the deep convolutional neural network further comprises a third sub-network; the third sub-network has a plurality of groups of fourth convolutional layers and a plurality of pooling layers; the plurality of groups of fourth convolutional layers corresponds to the third convolutional layers, respectively; the plurality of pooling layers corresponds to the plurality of groups of fourth convolutional layers, respectively; and an input of each of the pooling layers comprises the adjusted fusion feature maps and the primary target area frame data.

12. The method according to claim 11, further comprising:
iteratively executing the following target area frame regression training operation until the iteration meets an iteration termination condition:
separately convoluting the current fusion feature maps through the fourth convolutional layers to obtain the adjusted fusion feature maps;

performing area pooling on the adjusted fusion feature maps through the pooling layers according to the current primary target area frame data to obtain a new fusion feature map;
obtaining the new primary target area frame data from the new fusion feature map;
determining second differential data for object frame detection according to frame regression data between the unadjusted primary target area frame data and the new primary target area frame data, the new primary target area frame data, and corresponding target area frame labeling information; and
adjusting a network parameter of the third sub-network according to the second differential data.

13. The method according to claim 10, wherein prior to inputting a sample image containing target area frame labeling information in a deep convolutional neural network for target area frame detection to detect to obtain a plurality of fusion feature maps, the method further comprises:
zooming the sample image so that a ground truth of at least one object area frame is covered by the object detection frame.

14. The method according to claim 11, wherein the target area frame labeling information of the sample image comprises labeling information of a positive sample area frame and labeling information of a negative sample area frame;
the overlapping ratio of the positive sample area frame to the ground truth of the object area frame is not less than a first overlapping ratio value; the overlapping ratio of the negative sample area frame to the ground truth of the object area frame is not greater than a second overlapping ratio value; and the first overlapping ratio value is greater than the second overlapping ratio value.

15. The method according to claim 14, wherein the target area frame labeling information of the sample image further comprises labeling information of a neutral sample area frame; and the overlapping ratio of the neutral sample area frame to the ground truth of the object area frame is between the first overlapping ratio value and the second overlapping ratio value.

16. The method according to claim 15, wherein in all the sample images,
the proportion of a sum of the labeled positive sample area frames in the total number of frames of the positive sample area frames, the negative same area frames and the neutral sample area frames is not less than a predetermined first ratio, the first ratio is greater than 50%;
the proportion of a sum of the labeled negative sample area frames in the total number of frames is not greater than a predetermined second ratio; and
the proportion of a sum of the labeled neutral sample area frames in the total number of frames is not greater than a predetermined third ratio, the third ratio is not greater than half of the sum of the first ratio and the second ratio.

17. An apparatus for detecting an object, comprising:
a processor; and
a memory for storing instructions executable by the processor;
wherein the processor is configured to:
predict to obtain a plurality of fusion feature maps from a to-be-processed image through a deep convolutional neural network for target area frame detection, wherein the deep convolutional neural network comprises a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; and
obtain target area frame data according to the plurality of fusion feature maps obtained by the fusion feature map prediction module,
wherein at least one point in the fusion feature map has frame fusion detection data and prediction accuracy information corresponding to a plurality of object detection frames;
in order to obtain the target area frame data according to the plurality of fusion feature maps, the processor is configured to:
separately obtain target area frame data corresponding to the fusion feature maps according to the frame fusion detection data and prediction accuracy information in the at least one fusion feature map, wherein in response to that the prediction accuracy information of the frame fusion detection data of the at least one point in the fusion feature map is greater than a predetermined threshold, an area frame corresponding to the frame fusion detection data is determined as one of the target area frame data.

18. The apparatus according to claim 17, wherein the processor is further configured to train the deep convolutional neural network for target area frame detection by:
inputting a sample image containing target area frame labeling information in the deep convolutional neural network for target area frame detection to detect to obtain a plurality of fusion feature maps corresponding to the sample image;
obtaining target area frame data of the sample image according to the plurality of fusion feature maps corresponding to the sample image;
determining first differential data for object frame detection according to the obtained target area frame data of the sample image and the target area frame labeling information; and
adjusting a network parameter of the deep convolutional neural network according to the first differential data.

19. A non-transitory computer-readable storage medium having stored therein instructions that, when executed by a processor, cause the processor to perform the operations of:
predicting, by a deep convolutional neural network for target area frame detection, to obtain a plurality of fusion feature maps from a to-be-processed image, wherein the deep convolutional neural network comprises a first sub-network and a second sub-network; the first sub-network has at least one down-sampling layer, and the second sub-network has at least one up-sampling layer; the fusion feature maps are obtained through a first feature map and a second feature map; and the first feature map is obtained from the first sub-network, and the second feature map is obtained from the second sub-network; and
obtaining target area frame data according to the plurality of fusion feature maps,
wherein at least one point in the fusion feature map has frame fusion detection data and prediction accuracy information corresponding to a plurality of object detection frames;
the obtaining the target area frame data according to the plurality of fusion feature maps comprises:

separately obtaining target area frame data corresponding to the fusion feature maps according to the frame fusion detection data and prediction accuracy information in the at least one fusion feature map, wherein in response to that the prediction accuracy information of the frame fusion detection data of the at least one point in the fusion feature map is greater than a predetermined threshold, an area frame corresponding to the frame fusion detection data is determined as one of the target area frame data.

* * * * *